US 011169012B2

(12) United States Patent
Mashita et al.

(10) Patent No.: US 11,169,012 B2
(45) Date of Patent: Nov. 9, 2021

(54) PHYSICAL QUANTITY MEASURING DEVICE

(71) Applicant: DENSO CORPORATION, Kariya (JP)

(72) Inventors: Hajime Mashita, Kariya (JP); Junzo Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 114 days.

(21) Appl. No.: 16/595,692

(22) Filed: Oct. 8, 2019

(65) Prior Publication Data

US 2020/0033172 A1 Jan. 30, 2020

Related U.S. Application Data

(63) Continuation of application No. PCT/JP2018/010143, filed on Mar. 15, 2018.

(30) Foreign Application Priority Data

Apr. 19, 2017 (JP) .............................. JP2017-083101

(51) Int. Cl.
*G01F 1/69* (2006.01)
*F02M 35/10* (2006.01)
*G01F 15/12* (2006.01)
*G01K 13/02* (2021.01)

(52) U.S. Cl.
CPC ......... *G01F 1/69* (2013.01); *F02M 35/10262* (2013.01); *F02M 35/10386* (2013.01); *F02M 35/10393* (2013.01); *G01F 15/125* (2013.01); *G01K 13/02* (2013.01)

(58) Field of Classification Search
CPC . G01F 1/69; G01F 15/125; G01F 1/28; G01F 1/3209; G01F 15/046; G01F 5/00; G01F 1/6842; F02M 35/10262; F02M 35/10386; F02M 35/10393; G01K 13/02;
(Continued)

(56) References Cited

U.S. PATENT DOCUMENTS 6,526,822 B1 * 3/2003 Maeda .................. G01F 1/6842
73/204.21
6,868,722 B2 * 3/2005 Tanimoto .................. G01F 5/00
73/202.5
(Continued)

FOREIGN PATENT DOCUMENTS

JP 63-200765 12/1988
JP 2001-174305 6/2001
(Continued)

*Primary Examiner* — Freddie Kirkland, III
(74) *Attorney, Agent, or Firm* — Nixon & Vanderhye P.C.

(57) ABSTRACT

A physical quantity measuring device detects a physical quantity of gas flowing in a flow passage. The physical quantity measuring device includes a sensor element that outputs a detection signal according to the physical quantity, a case that is provided to the flow passage and houses the sensor element, and a protrusion that protrudes from a passage wall surface facing the flow passage. The case includes a measurement chamber that houses the sensor element and an inflow port that is configured to cause a part of gas flowing in the flow passage to flow into the measurement chamber therethrough. The protrusion is configured to guide gas flowing along the passage wall surface toward the inflow port.

15 Claims, 15 Drawing Sheets

(58) Field of Classification Search
CPC .. G01K 13/024; G01K 2205/02; Y02T 10/12; G01N 27/04; G01N 27/12; G01N 27/22
See application file for complete search history.

(56) References Cited

U.S. PATENT DOCUMENTS

| | | | |
|---|---|---|---|
| 7,685,874 B2* | 3/2010 | Nakano | G01F 1/6845 73/204.21 |
| 10,018,492 B2* | 7/2018 | Morino | G01F 1/6842 |
| 10,024,701 B2* | 7/2018 | Yamaguchi | G01F 5/00 |
| 10,041,455 B2* | 8/2018 | Tsujii | G01F 1/692 |
| 10,190,551 B2* | 1/2019 | Tsujii | G01F 5/00 |
| 10,612,955 B2* | 4/2020 | Akagi | G01F 1/6845 |
| 10,662,908 B2* | 5/2020 | Tsujii | F02D 41/1462 |
| 2004/0226357 A1* | 11/2004 | Tanimoto | G01F 5/00 73/202.5 |
| 2008/0016959 A1* | 1/2008 | Nakano | G01F 1/6842 73/204.26 |
| 2010/0031737 A1 | 2/2010 | Saito et al. | |
| 2012/0079879 A1 | 4/2012 | Saito et al. | |
| 2015/0355009 A1 | 12/2015 | Goka et al. | |
| 2016/0097661 A1 | 4/2016 | Hidaka et al. | |
| 2018/0113015 A1* | 4/2018 | Akagi | G01F 1/6845 |

FOREIGN PATENT DOCUMENTS

| | | |
|---|---|---|
| JP | 2006-343107 | 12/2006 |
| JP | 2010-151795 | 7/2010 |
| JP | 2015-141070 | 8/2015 |

\* cited by examiner

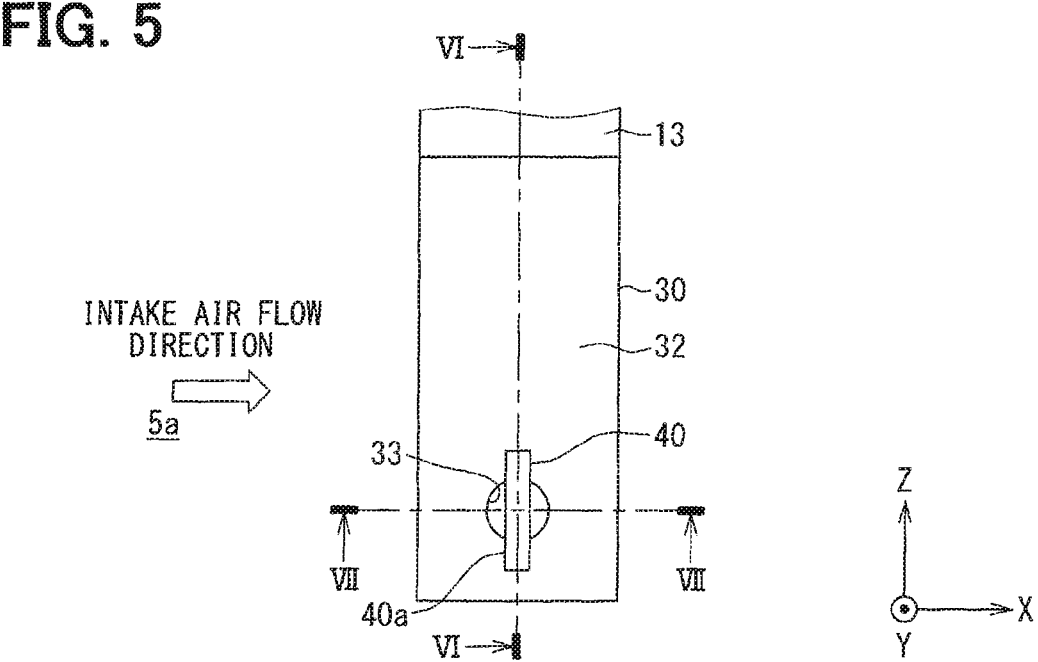
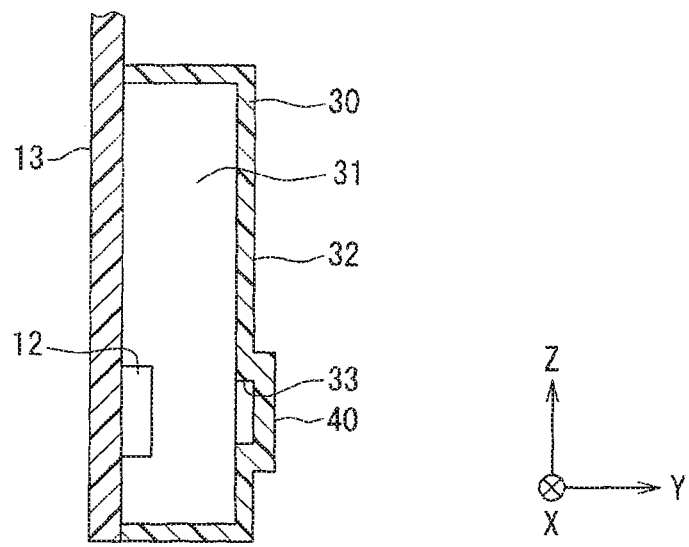
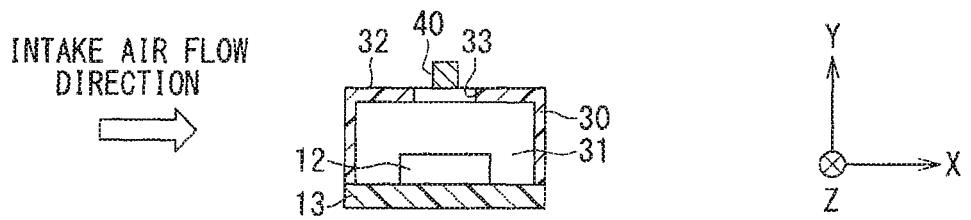

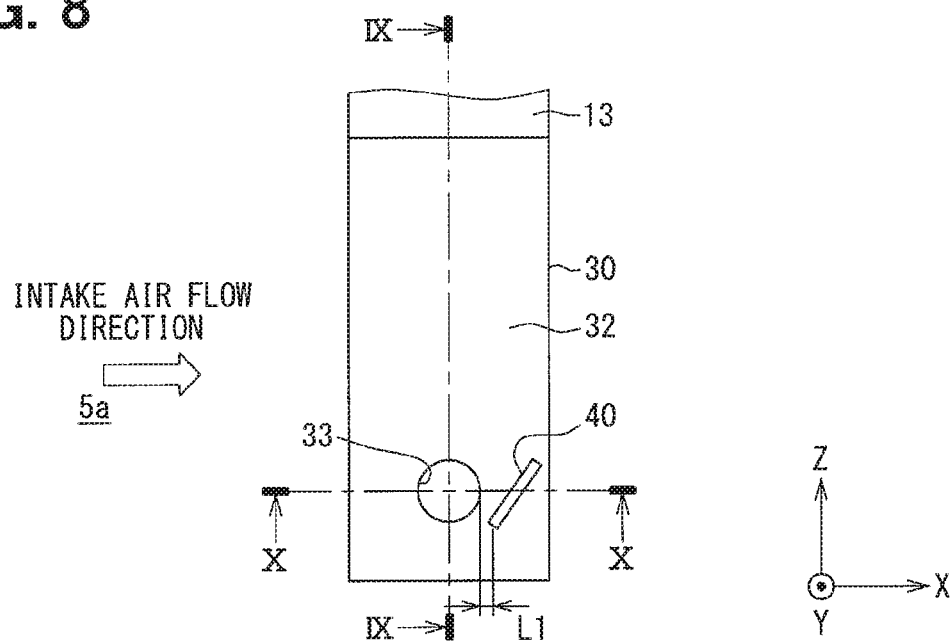
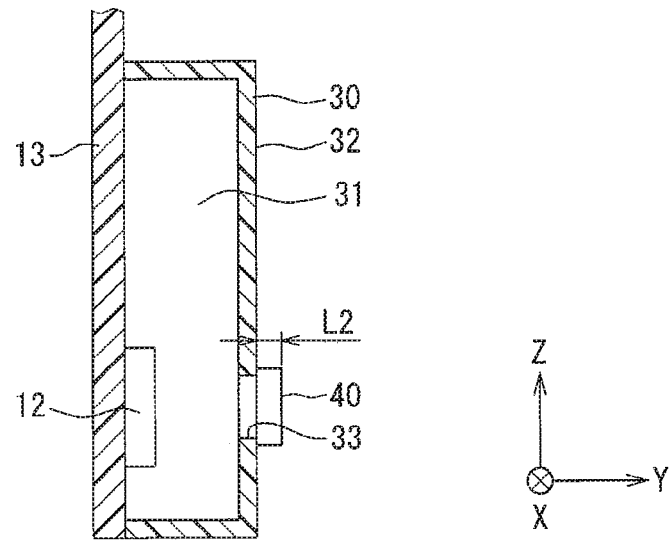
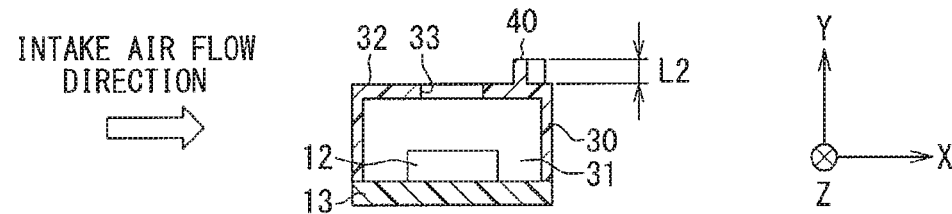

INTAKE AIR FLOW DIRECTION

INTAKE AIR FLOW DIRECTION

US 11,169,012 B2

PHYSICAL QUANTITY MEASURING DEVICE

CROSS REFERENCE TO RELATED APPLICATION

The present application is a continuation application of International Patent Application No. PCT/JP2018/010143 filed on Mar. 15, 2018, which designated the U.S. and claims the benefit of priority from Japanese Patent Application No. 2017-083101 filed on Apr. 19, 2017. The entire disclosures of all of the above applications are incorporated herein by reference.

TECHNICAL FIELD

The present disclosure relates to a physical quantity measuring device for detecting a physical quantity of gas.

BACKGROUND

A known humidity sensor is provided to an intake passage for detecting a humidity of intake air which is taken into a combustion chamber of an internal engine. One example of a known humidity sensor includes a sensor element to output an electric signal according to a humidity.

SUMMARY

A physical quantity measuring device according to an aspect of the present disclosure includes a sensor element that is configured to output a detection signal according to a physical quantity, a case that is provided to a flow passage and houses the sensor element, and a protrusion that protrudes from a passage wall surface facing the flow passage and configured to guide gas flowing along the passage wall surface toward the inflow port. The sensor element is housed in the case.

BRIEF DESCRIPTION OF THE DRAWINGS

The above and other objects, features and advantages of the present disclosure will become more apparent from the following detailed description made with reference to the accompanying drawings. In the drawings:

FIG. 5 is a front view showing a part around the humidity sensor of the measuring device according to a second embodiment.

FIG. 6 is a sectional view taken along a line VI-VI in FIG. 5.

FIG. 7 is a sectional view taken along a line VII-VII in FIG. 5.

FIG. 8 is a front view showing a part around the humidity sensor of the measuring device according to a third embodiment.

FIG. 9 is a sectional view taken along a line IX-IX in FIG. 8.

FIG. 10 is a sectional view taken along a line X-X in FIG. 8.

DETAILED DESCRIPTION

Figure 1:
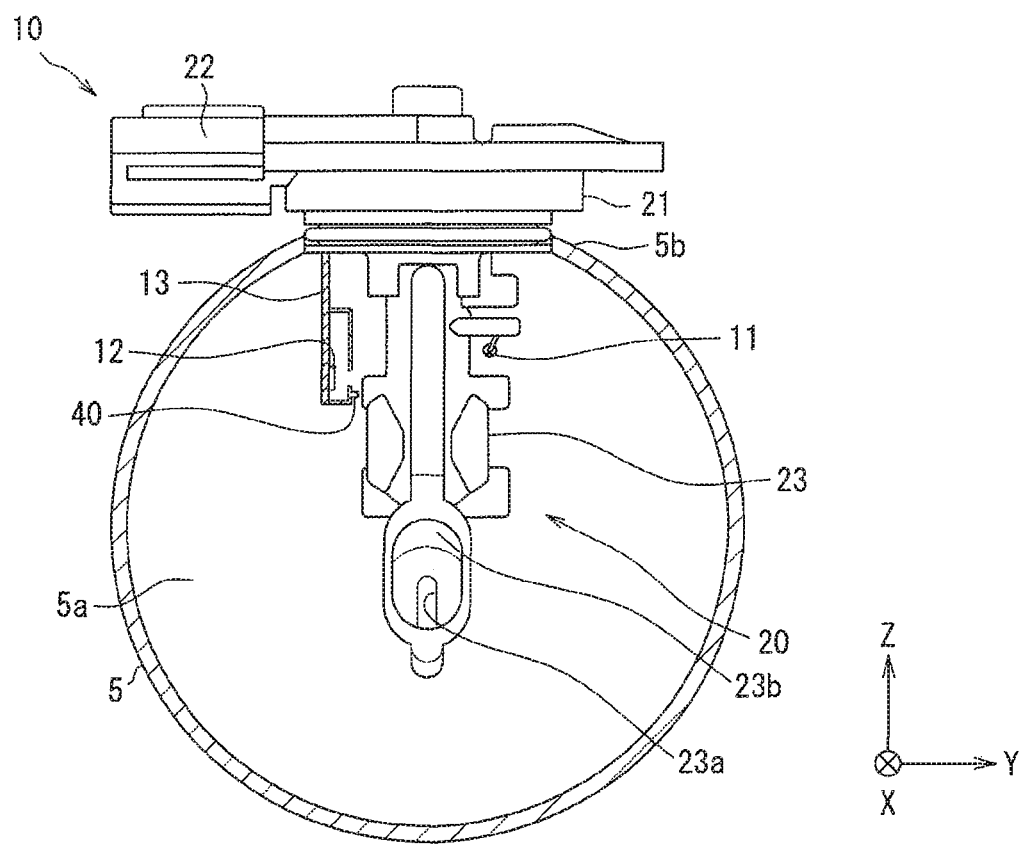
FIG. 1 is a view showing a measuring device which is provided to an air intake pipe according to a first embodiment.

Hereinafter, one example of the present disclosure will be described.

In an assumable configuration, a humidity sensor is provided to an intake passage for detecting a humidity of intake air which is taken into a combustion chamber of an internal engine. The humidity sensor includes a sensor element to output an electric signal according to humidity. If dust in intake air attaches to the sensor element, a detection accuracy of the humidity decreases.

Therefore, in this assumable configuration, a measurement chamber which is inside of a case including an inflow port of intake air houses the sensor element, and the case is provided in the intake passage. This restrains dust from attaching to the sensor element.

In this assumable configuration, the case houses the sensor element as described above thereby to enable to restrain dust from attaching and a decrease in the detection accuracy. However, in this configuration, a flow velocity in the measurement chamber is low, and this configuration requires to replace an air in the measurement chamber with an air outside the measurement chamber. Therefore, this configuration could reduce a responsiveness of detection in the case where humidity changes.

According to an aspect of the present disclosure, a physical quantity measuring device is configured to detect a physical quantity of gas flowing in a flow passage. The physical quantity measuring device comprises a sensor element that is configured to output a detection signal according to the physical quantity, a case that is provided to the flow passage and houses the sensor element, and a protrusion that protrudes from a passage wall surface facing the flow passage and configured to guide gas flowing along the passage wall surface toward the inflow port. The case defines a measurement chamber that houses the sensor element and an inflow port that is configured to cause a part of gas flowing in the flow passage to flow into the measurement chamber therethrough.

According to the aspect described above, the sensor element is housed in the case, thereby to enable to restrain dust in gas flowing in the intake passage from attaching to the sensor element. Furthermore, the protrusion is configured to guide gas flowing along the passage wall surface facing the intake passage toward the inflow port. Therefore, the replacement of measured gas which is air in the measurement chamber and air outside of the measurement chamber is promoted. This enhances the responsiveness of the detection in the case where humidity changes. That is, this enables to restrain the decrease in the detection accuracy due to adhesion of the dust and to keep a responsiveness of detection.

Furthermore, dust flowing in gas has a larger inertia and hardly changes the flow direction, compared to gas. Therefore, gas turns toward the inflow port by the protrusion while dust in the gas hardly turns, and therefore, inertial separation occurs to remove the dust from the gas. That is, this also enables to restrain the deterioration of the detection accuracy due to adhesion of the dust and to keep the responsiveness of detection.

The physical quantity measuring device according to the aspect enables to restrain a deterioration of detection accuracy due to attachment of dust and to keep the responsiveness of detection.

Multiple embodiments will be described with reference to drawings as follows. In each embodiment, the same reference numerals are given to the structures corresponding to descriptions in preceding embodiment in order to avoid repeated explanation. In each embodiment, in a case where a part of structures is described, other structure which has already been described may be referred and applied to other part in the structure.

First Embodiment

A physical quantity measuring device in the present embodiment is shown in FIG. 1 and referred to as a measuring device 10 hereinafter. The measuring device 10 is provided to an air intake pipe 5 in which an intake passage 5a guiding air to flow into a combustion chamber of an internal engine is formed. Air which is taken into the combustion chamber through the intake passage 5a is referred to as intake air hereinafter. Arrows X, Y, and Z show directions of the measuring device 10 which is attached to the air intake pipe 5. The arrow X shows a direction to which the intake air flows. The arrow Y shows a direction which is perpendicular to the direction in which intake air flows and is a horizontal direction. The arrow Z shows a vertical direction.

The physical quantity measuring device 10 is configured to measure a physical quantity of intake air, more specifically, a flow amount, temperature and humidity of intake air. The measuring device 10 includes a flow sensor which outputs a detection signal according to the flow amount and is unillustrated, a temperature sensor 11 which outputs a detection signal according to the temperature, and a humidity sensor 12 which outputs a detection signal according to the humidity.

The measuring device 10 is configured to send the above various detection signals to an electric control device in an outside of the measuring device. The measurement results which is obtained and sent by the measuring device 10 are used to control an opening of a throttle valve controlling a flow amount of intake air, an amount of a fuel injection by a fuel injector, and an amount of exhaust gas recirculation (EGR).

The measuring device 10 includes a structure body 20 which is made of a resin. The structure body 20 includes a flange 21, a connector 22, and a flow rate detection part 23. The flange 21 is attached to the air intake pipe 5 so as to close an opening 5b of the air intake pipe 5, and supports the connector 22 and the flow rate detection part 23. The connector 22 is provided at an outside of the intake passage 5a and includes a terminal for outputting the detection signal.

The flow rate detection part 23 is provided to the intake passage 5a and includes a first passage 23a and a second passage 23b. The first passage 23a is arranged to extend in parallel to a direction in which the intake air flows in the intake passage 5a, that is, in a direction perpendicular to a paper surface in FIG. 1. The first passage 23a is configured to intake and distributes a part of the intake air flowing in the intake passage 5a. The second passage 23b is branched from the first passage 23a. The second passage 23b is configured to intake a part of the intake air flowing in the first passage 23a and to guide the intake air to flow to the flow sensor. The second passage 23b is arranged such that the intake air which is split from the first passage 23a is circulated through the second passage 23b and flows out from an unillustrated outlet port to the intake passage 5a.

The flow sensor is such as a thermal flow sensor using a heating resistor. The flow sensor is configured to output a signal corresponding to a flow velocity of air flowing in the second passage 23b. The output signal has a correlation with a flow amount of intake air, which is referred to as an intake air flow rate, flowing in the intake passage 5a. Therefore, the flow sensor is configured to detect the flow amount of intake air flowing in the intake passage 5a. The flow sensor outputs an electric signal according to the intake air flow rate. The electric signal is outputted to the terminal which is attached to the connector 22. The flow sensor is not limited to the thermal flow sensor and may use another type such as a movable flap type, a Karman vortex type, or the like.

The temperature sensor 11 is attached to the flow rate detection part 23 and exposed to the intake passage 5a. This enables the temperature sensor 11 to detect a temperature of intake air flowing in the intake passage 5a. The temperature sensor 11 outputs an electric signal according to the temperature of the intake air. The electric signal is outputted to the terminal which is attached to the connector 22. The detection signals which are outputted from the flow sensor, the temperature sensor 11, and the humidity sensor 12 may be a digital signal or an analog signal.

Figure 2:
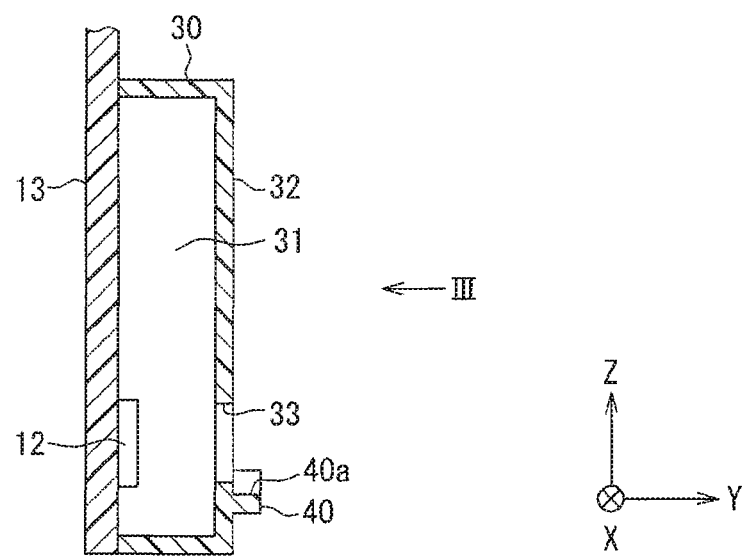
FIG. 2 is a sectional view taken along a line II-II in FIG. 3 and showing a part around a humidity sensor shown in FIG. 1 schematically.

As shown in FIG. 2, the humidity sensor 12 is mounted to a board 13. The board 13 is held by an unillustrated bracket which is made of a resin. The bracket is attached to the flow rate detection part 23 or the flange 21. The temperature sensor 12 is configured to measure a relative humidity of air, and is such as an electrostatic capacitance type of humidity sensor for measuring an electrical capacitance between a pair of electrodes holding the moisture sensitive material which absorbs and removes moisture in air. The humidity sensor 12 may be a resistance type humidity sensor for outputting a change in an electric resistance according to humidity as an electric signal.

The case 30 is made of a resin and is attached to the board 13. The humidity sensor is mounted to the board 13 and housed in the case 30. The case 30 has a rectangular parallelepiped shape and is placed in the intake passage 5a such that each of wall surfaces of the rectangular parallelepiped is along the arrows X, Y or Z, respectively. The length of the case 30 in a Z direction is longer than these in an X direction and a Y direction.

A passage wall surface 32 is a wall of the case 30 along an XZ plane and is opposed to the board 13. The passage wall surface 32 includes an inflow port 33 through which a part of intake air flowing in the intake passage 5a flows into a measurement chamber 31 which is an internal space of the case 30. The humidity sensor 12 is placed in the internal space and detects humidity in intake air flowing from the inflow port 33 to the measurement chamber 31. That is, the humidity sensor 12 outputs an electric signal according to the humidity in air in the measurement chamber 31. The electric signal is outputted to the terminal which connects the board 13 to the connector 22.

The inflow port 33 is opposed to the humidity sensor 12. This enables to prevent air including dust in the intake passage 5a from flowing into the measurement chamber 31 through the inflow port 33. The closer to the wall surface in the intake passage 5a, the slower the flow velocity becomes, and the more a heat transfer from an engine room affects. On the other hand, the closer to the center of the intake passage 5a, the faster the flow velocity becomes, and the faster the temperature change and the humidity change in outside air are transferred. That is, the closer to the center of the intake passage 5a, the less the heat transfer from the engine room affects. Therefore, the inflow port 33 is provided to the case 30 at a position lower than a center of the case 30 in the vertical direction, which corresponds to the Z direction. This configuration enables the humidity sensor 12 to perform the measurement with a fast response and a high precision under relatively unsusceptible to the heat effect.

Figure 3:
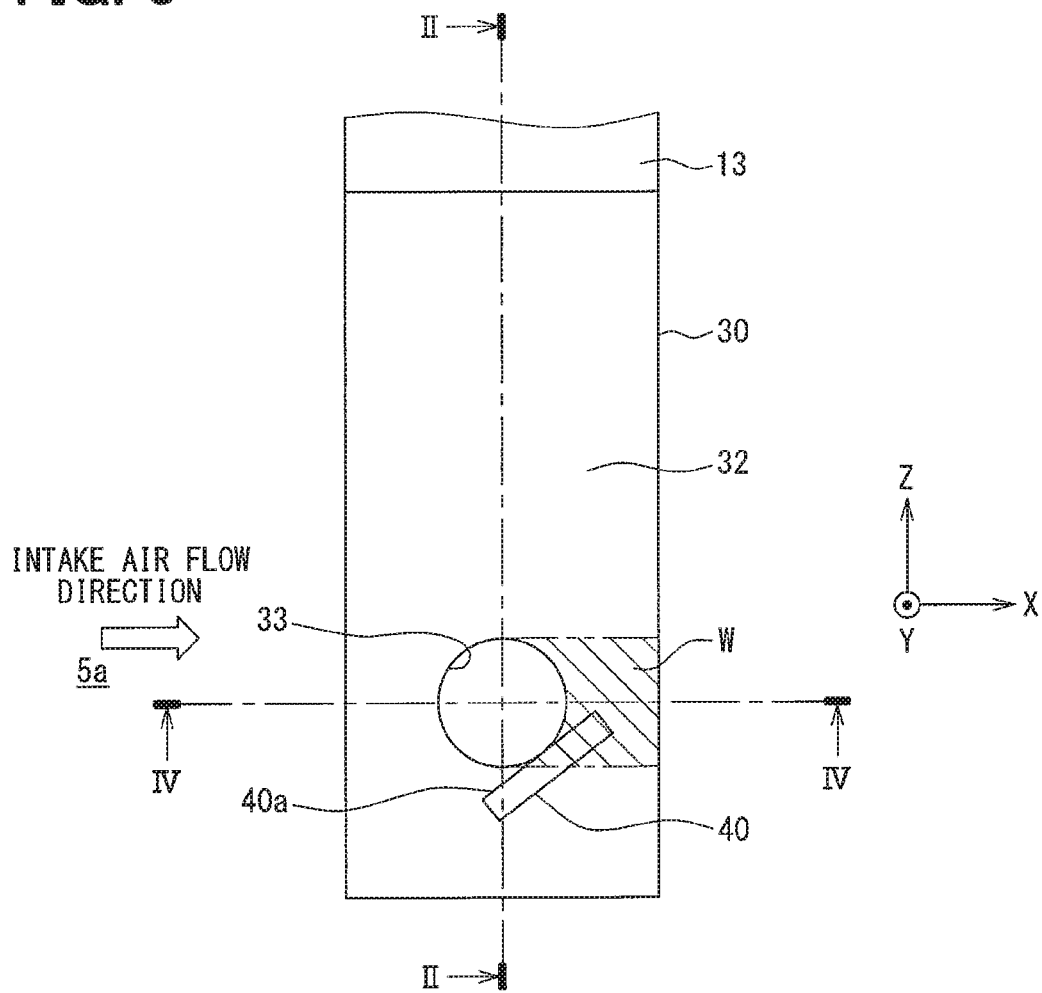
FIG. 3 is a view viewed along an arrow III in FIG. 2.

As shown in FIG. 3, the inflow port 33 is placed at a center in the direction (X direction) in which the intake air flows. The inflow port 33 has a circular shape, when viewed in the Y direction, same as the shape of the humidity sensor 12 viewed in the Y direction, as shown in FIG. 3. The humidity sensor 12 and the inflow port 33 may have an elliptical or polygon shape when viewed in the Y direction.

Figure 4:
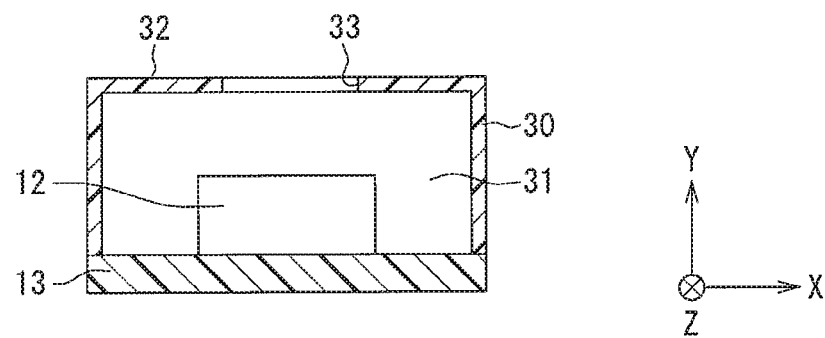
FIG. 4 is a sectional view taken along a line IV-IV in FIG. 3.

As shown in FIG. 2, the humidity sensor 12 has the same length in the Z direction as the inflow port in the Z direction. As shown in FIG. 4, the humidity sensor 12 in the X direction has the same length as the inflow port 33 in the X direction. The inflow port 33 may be smaller than the humidity sensor 12. This enables to reduce the dust entering the case 30 and to restrain deterioration of a detection accuracy of the humidity sensor 12. On the other hand, the inflow port 33 may be set bigger than the humidity sensor 12 to enhance a responsiveness of the humidity sensor 12. That is, the responsiveness and the resistance to the dust can be easily enhanced by changing the opening shape of the inflow port 33.

The case 30 includes a protrusion 40 protruding from the passage wall surface 32. The protrusion 40 is molded of a resin integrally with the passage wall surface 32 of the case 30. The protrusion 40 has a plate form. A plate surface of the protrusion 40 intersects the direction in which intake air flows. A guide surface 40a is one plate surface of the protrusion 40 and collides with intake air. The guide surface 40a is not required to be perpendicular to the XZ plane. An angle between the guide surface 40a and the XZ plane, that is, an angle between the guide surface 40a and the passage wall surface 32 may be an obtuse angle. The guide surface 40a in this case enables to decrease a pressure loss compared to a case where the guide surface 40a is perpendicular to the XZ plane.

An area shown by hatched lines in FIG. 3 indicates a downstream of the inflow port 33 in the direction (X direction), in which intake air flows, in the passage wall surface 32 of the case 30. That is, the area shown by the hatched lines in FIG. 3 indicates a projection area W of the inflow port 33 in the direction in which intake air flows. At least a part of the guide surface 40a of the protrusion 40 is located in the projection area W. Therefore, the guide surface 40a guides a part of intake air flowing along the passage wall surface 32 to flow into the inflow port 33. That is, the guide surface 40a promotes the inflow of intake air flowing along the passage wall surface 32 into the inflow port 33. In a configuration where the angle between the guide surface 40a and the XZ plane, that is, the angle between the guide surface 40a and the passage wall surface 32 is an acute angle, the inflow of intake air into the inflow port 33 is promoted.

The measurement chamber 31 and the intake passage 5a are communicated to each other only through the inflow port 33. Therefore, inflow air in the measurement chamber 31 flows to the intake passage 5a through the inflow port 33 by an amount same as the amount of inflow air flowing into the measurement chamber 31 from the inflow port 33. That is, the guide surface 40a guides intake air flowing along the passage wall surface 32 to flow into the inflow port 33. This promotes replacement of measured gas which is air in the measurement chamber 31 and air outside of the measurement chamber 31.

In FIG. 3, a part of the guide surface 40a is placed at an upstream of a center of the inflow port 33 in the direction in which intake air flows. However, the guide surface 40a may be placed such that an entirety of the guide surface 40a is placed at the upstream of the center of the inflow port 33 in the direction in which intake air flows. In FIG. 3, the entirety of the guide surface 40a is placed lower than the center of the inflow port 33 in the vertical direction. However, the guide surface 40a may be placed such that a part of the guide surface 40a is placed above the center of the inflow port 33 in vertical direction. At least a part of the guide surface 40a is preferably placed lower than the center of the inflow port 33 in the vertical direction.

In FIG. 3, the entirety of the guide surface 40a is placed lower than the center of the inflow port 33 in the vertical direction and is inclined toward the center of the inflow port 33. A width which is the length of the guide surface 40a in the XZ plane according to FIG. 3 is larger than the height of the guide surface 40a which is projected in the Y direction according to FIG. 2.

As described above, according to the present embodiment, the case 30 houses the humidity sensor 12. The case 30 includes the measurement chamber 31 in which the humidity sensor 12 is placed and the inflow port 33 through which a part of intake air flowing in the intake passage 5a flows into the measurement chamber 31. The case 30 further includes the protrusion 40 protruding from the passage wall surface 32 of the case 30, and guiding intake air flowing along the passage wall surface 32 to flow into the inflow port 33.

This configuration in which the humidity sensor 12 is housed in the case 30 enables to restrain the dust in intake air flowing in the intake passage 5a from attaching on the humidity sensor 12 and to enhance the detection accuracy of the humidity sensor 12. More specifically, if the dust is attached to the electrode of the electrostatic capacitive type of the humidity sensor 12, the humidity sensor 12 outputs a signal with a value deviating from a true value corresponding to the humidity of the moisture sensitive material. The configuration enables to restrain the deviation caused in the detection.

The protrusion 40 guides intake air flowing along the passage wall surface 32 to flow into the inflow port 33. This promotes the replacement between air in the measurement chamber 31 and air outside of the measurement chamber 31. Therefore, in a case where a humidity in intake air flowing in the intake passage 5a changes, this enables to enhance a responsiveness of detection under the change. That is, this enables to restrain the deterioration of the detection accuracy due to adhesion of the dust and to keep the responsiveness of detection.

The dust flowing in intake air has a larger inertia and hardly changes the flow direction, compared to intake air which is gas. Therefore, intake air deflects toward the inflow port 33 by the protrusion 40 while dust in the intake air hardly deflects, and therefore, inertial separation occurs to remove the dust from intake air. The inertial separation allows intake air which is a gas to be curved by the protrusion 40 and easily to flow in through the inflow port 33. On the other hand, the dust with a large mass is likely to flow straight without turning, and is not easily flow in through the inflow port 33 in comparison with intake air. This configuration enables to restrain the deterioration of the detection accuracy due to the adhesion of the dust and to keep the responsiveness of the detection.

In this embodiment, the protrusion 40 is placed in the projection area W to which the inflow port 33 is projected from the upstream to the downstream in the direction in which intake air flows. This enables to promote the inflow of intake air into the inflow port 33 and to enhance avoidance of inflow of dust in comparison with a case where the protrusion 40 is placed out of the projection area W.

Second Embodiment

In above the first embodiment, as shown in FIG. 3, the entirety of the protrusion 40 is placed at the outside of the inflow port 33. On the other hand, in this embodiment, the protrusion 40 is placed so as to straddle the inflow port 33 as shown in FIGS. 5-7. More specifically, the protrusion 40 is provided such that the guide surface 40a is perpendicular to the direction in which intake air flows. The center of the protrusion 40 is placed at the center of the inflow port 33 when viewed in the Y direction.

According to the configuration, similarly to the first embodiment, intake air flowing along the passage wall surface 32 is guided to flow into the inflow port 33 by the protrusion 40. This promotes the replacement between air in the measurement chamber 31 and air out of the measurement chamber 31. This enables to restrain the deterioration of the detection accuracy due to the adhesion of the dust and to keep the quality of the responsiveness of the detection. Furthermore, due to the inertial separation described above, intake air is curved due to the protrusion 40 and easily flows in through the inflow port 33. On the other hand, dust does not flow in through the inflow port 33 as easily as intake air does. Therefore, this enables to restrain the deterioration of the detection accuracy due to the adhesion of the dust and keep the responsiveness of the detection.

Furthermore, in this embodiment, the protrusion 40 is placed so as to straddle the inflow port 33. This promotes the inflow of intake air into the measurement chamber 31 through the inflow port 33 on the upstream side of the protrusion 40 in the direction in which intake air flows. This also promotes the outflow of air in the measurement chamber 31 to the outside of the measurement chamber 31 through the inflow port 33 on the downstream side of the protrusion 40 in the direction in which intake air flows. Therefore, this further promotes the replacement of air between the inside and the outside of the measurement chamber 31 and enhances the responsiveness of the detection.

Third Embodiment

In the first embodiment described above, a part of the guide surface 40a of the protrusion 40 is placed at the downstream of the inflow port 33 in the direction in which intake air flows as shown in FIG. 3. In this embodiment, as shown in FIGS. 8-10, the entirety of the guide surface 40a of the protrusion 40 is placed at the downstream of the inflow port 33 in the direction in which intake air flows. The guide surface 40a is arranged in parallel to a center line of the inflow port 33 extending in the Y direction and is inclined relative to the X direction.

A clearance L1 is a distance in the X direction between the downstream end of the inflow port 33 and the upstream end of the protrusion 40. A height L2 is a length of the protrusion 40 in the Y direction. The protrusion 40 is placed such that the clearance L1 is shorter than the height L2.

If the clearance L1 is too long, the effect of the protrusion 40 for promoting inflow air to flow into the inflow port 33 is not sufficiently obtained. However, in the case where the height L2 of the protrusion 40 is large enough, even if the clearance L1 is too long, the protrusion 40 is enabled to promote inflow air to flow into the inflow port 33 enough. In this embodiment, the clearance L1 between the inflow port and the protrusion 40 is shorter than the height L2 of the protrusion 40. That is, this configuration enables to avoid insufficient effect for promoting the inflow of air to the inflow port 33 due to the clearance that is too long.

Fourth Embodiment

Figure 11:
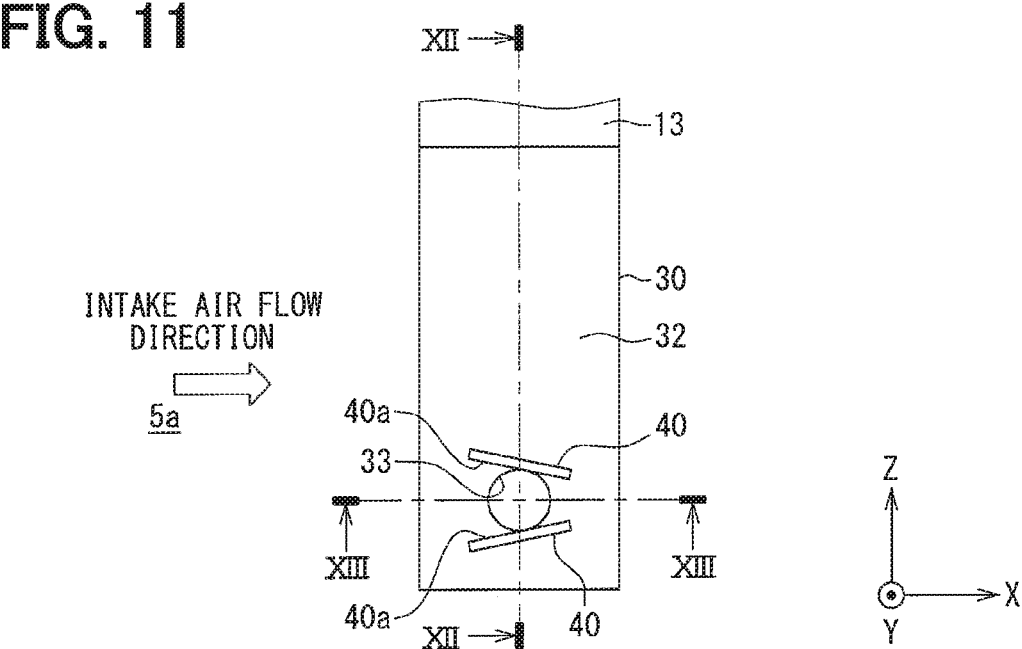
FIG. 11 is a front view showing a part around the humidity sensor of the measuring device according to a fourth embodiment.
Figure 12:
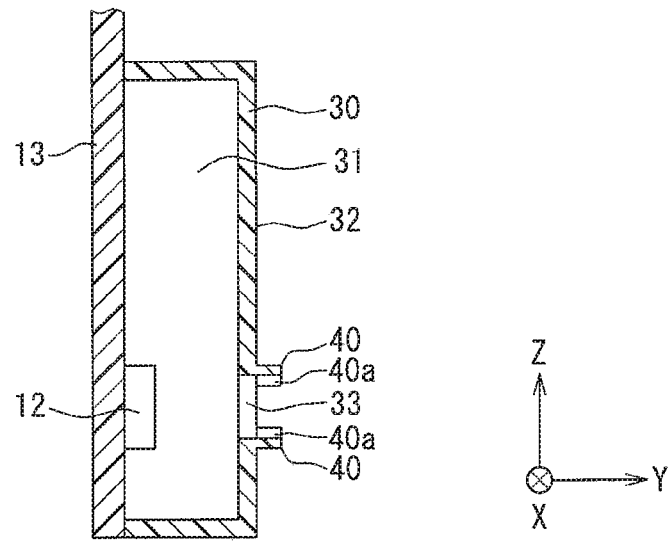
FIG. 12 is a sectional view taken along a line XII-XII in FIG. 11.
Figure 13:
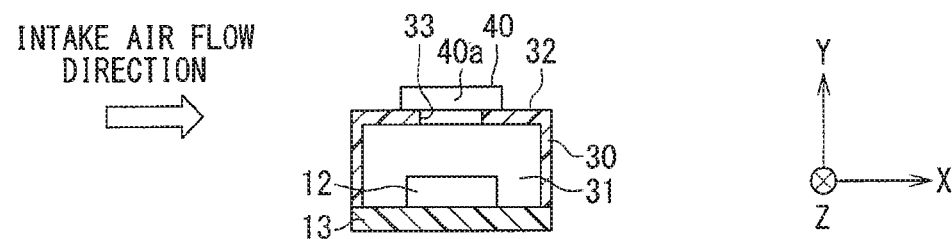
FIG. 13 is a sectional view taken along a line XIII-XIII in FIG. 11.

In the first embodiment described above, one protrusion 40 is provided as shown in FIG. 3. In this embodiment, two protrusions 40 are provided as shown in FIGS. 11-13. The two protrusions 40 are opposed to each other through the inflow port 33. These two protrusions 40 are inclined such that the further the protrusions 40 is closer to the downstream side than the upstream side in the direction in which intake air flows, the further a clearance between the two protrusions is smaller.

More specifically, the two protrusions 40 are arranged symmetrically with the central line of the inflow port 33 as an axis of symmetry in the direction in which intake air flows. The two guide surfaces 40a are inclined relative to the direction in which intake air flows. The further the position is closer to the downstream in the direction in which intake air flows, the further the clearance between the two guide surfaces 40a in the Z direction is shorter. Therefore, intake air flowing between the two guide surfaces 40a loses a place to flow as the clearance becomes shorter. Thus, a part of the intake air flows into the inflow port 33, and the replacement of air in the measurement chamber 31 is promoted. In the direction in which intake air flows, the length of the protrusion 40 is longer than the length of the inflow port 33. In FIG. 13 which is the view in the Z direction, the entirety of the inflow port 33 is overlapped with the protrusion 40. In other words, the guide surface 40a is provided throughout the entirety of the portion between upstream end and the downstream end of the inflow port 33.

Fifth Embodiment

Figure 14:
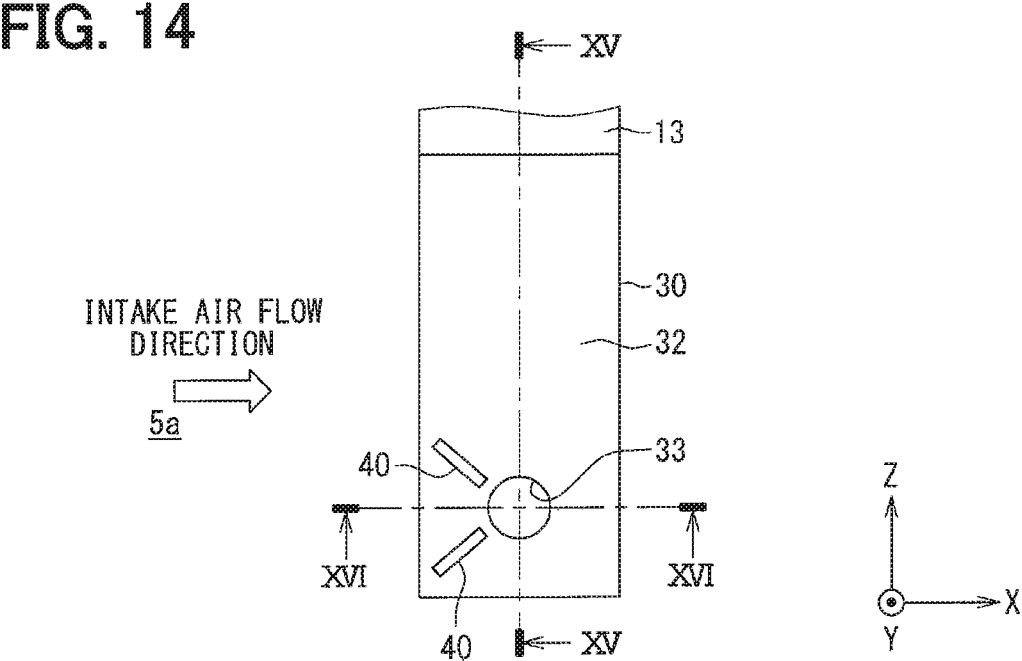
FIG. 14 is a front view showing a part around the humidity sensor of the measuring device according to a fifth embodiment.
Figure 15:
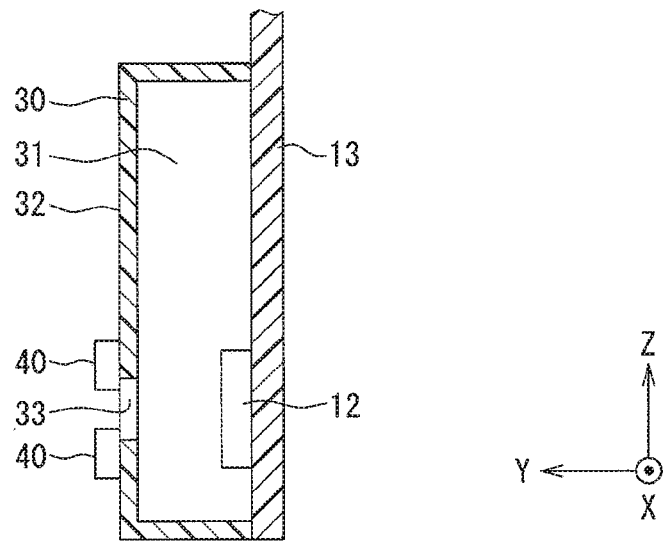
FIG. 15 is a sectional view taken along a line XV-XV in FIG. 14.
Figure 16:
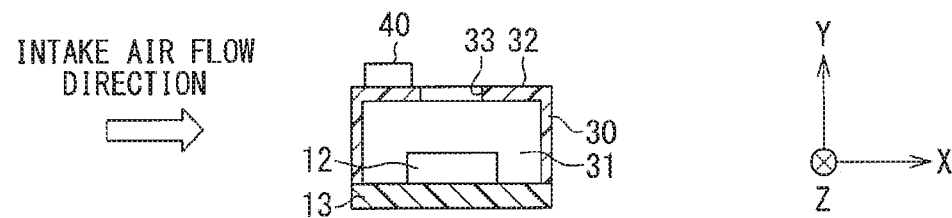
FIG. 16 is a sectional view taken along a line XVI-XVI in FIG. 14.

In the fourth embodiment described above, the two guide surfaces 40a are provided throughout the entirety of the portion between the upstream end and the downstream end of the inflow port 33. In this embodiment, the two protrusions 40 are provided on the upstream side than the upstream end of the inflow port 33 as shown in FIGS. 14-16. The downstream end of the protrusion 40 is arranged on the upstream side than the upstream end of the inflow port 33. Intake air flows into the area between the guide surfaces 40a and passes through that area between the two guide surfaces 40a. The further the intake air passes in the direction in which intake air flows, the more the clearance between the guide surfaces 40a is decreased. Therefore, a flow velocity of the intake air after passing between the guide surfaces 40a is increased. This increases a flow velocity of air passing by the inflow port 33. A pressure is decreased when the flow velocity is fast. Therefore, air in the measurement chamber 31 is ejected and this promotes the replacement of air. In this case, multiple inflow ports 33 may be provided to separate roles of an inflow and an outflow for the measurement chamber 31. This promotes a replacement of the air in the measurement chamber 31.

Sixth Embodiment

Figure 17:
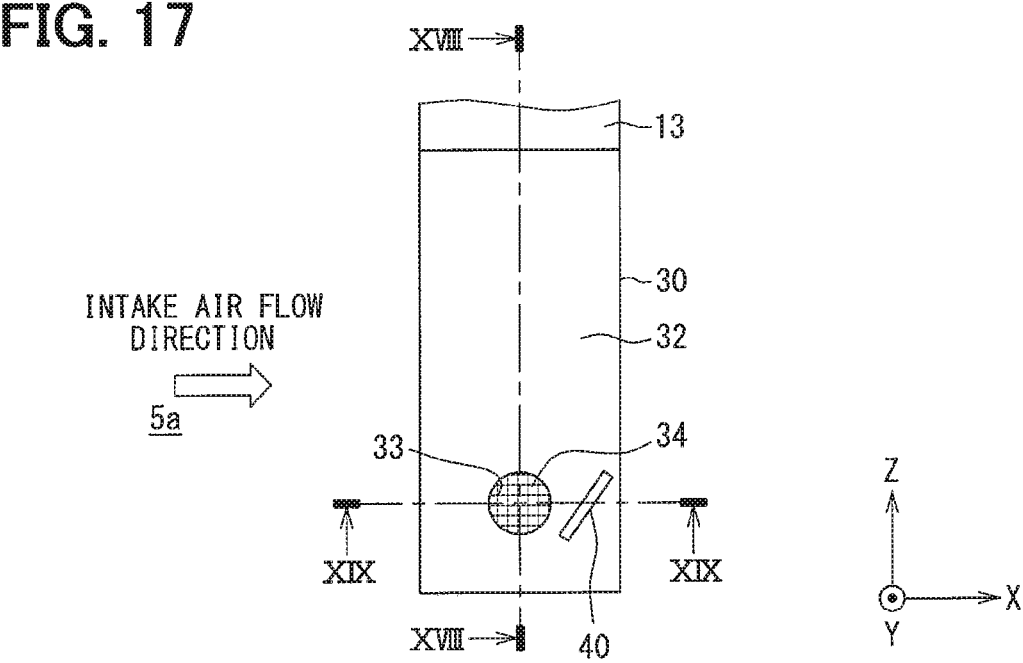
FIG. 17 is a front view showing a part around the humidity sensor of the measuring device according to a sixth embodiment.
Figure 18:
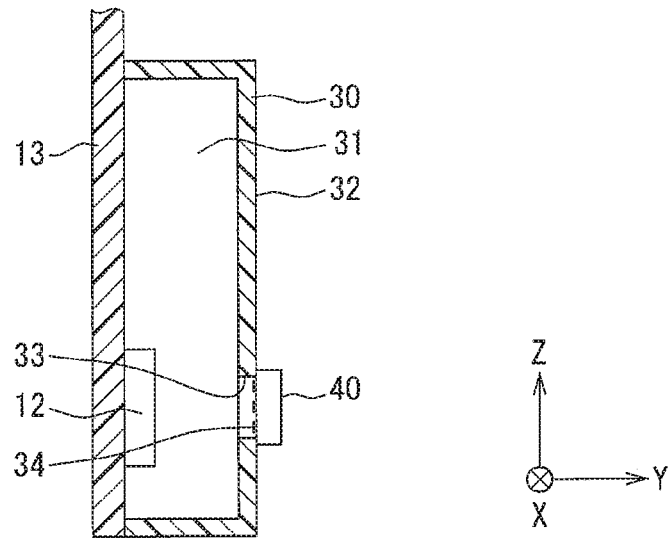
FIG. 18 is a sectional view taken along a line XVIII-XVIII in FIG. 17.
Figure 19:
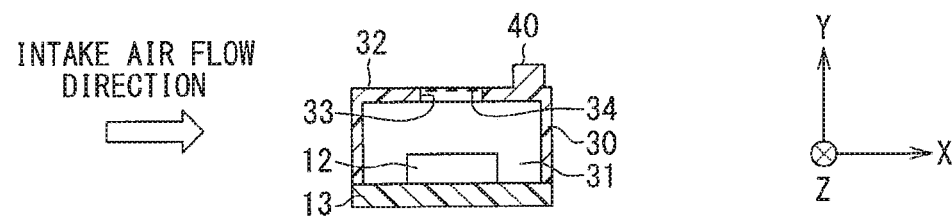
FIG. 19 is a sectional view taken along a line XIX-XIX in FIG. 17.

In this embodiment shown in FIGS. 17-19, an inflow port filter 34 is added to the case 30 which is shown in FIGS. 8-10. The inflow port filter 34 captures foreign matter in intake air. The inflow port filter 34 is attached to the case 30 so as to cover the entirety of the inflow port 33. The filter 34 is made of a material, such as a paper, a resin or the like, which produces a trapping effect of dust. However, a porous filter made of PTFE is preferable as the material of the filter 34. The porous filter made of PTFE is enabled not only to catch foreign matter in intake air, but also, due to a water repellent property of PTFE, to restrict water drop from entering into the measurement chamber 31.

The case 30 is enabled to mount the porous filter made of PTFE by heat-welding. The filter 34 and the case 30 are melted and mounted in a process of the heat-welding. This enables to reduce an amount of parts such as glue or the like.

In a case where a diameter of the filter 34 is small, a pressure loss caused by the filter 34 affects largely, and the flow velocity of air flowing into the measurement chamber 31 may get lower. However, the protrusion 40 increases the flow velocity on the filter 34 and constantly replaces the flow. Therefore, it is effective to provide the protrusion so that the humidity in the measurement chamber 31 changes due to a diffusion of the humidity.

The filter 34 may be mounted to the case 30 on either a side of the measurement chamber 31 or a side of the intake passage 5a. However, the filter 34 is preferably provided on the side of the measuring chamber 31 of the case 30. This is to restrict the filter 34 from falling into the flowing passage to flow to the downstream to get stack in a throttle, or from flowing in an engine cylinder.

In this embodiment, the inflow port filter 34 is provided to the inflow port 33 and catches foreign matter in intake air. This enables to restrain the dust in intake air flowing in the intake passage 5a from attaching to the humidity sensor 12.

Seventh Embodiment

Figure 20:
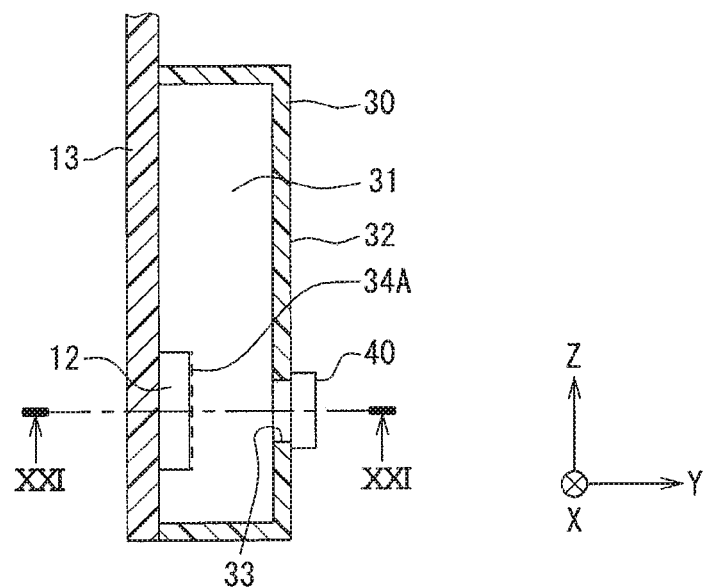
FIG. 20 is a longitudinal sectional view showing a part around the humidity sensor of the measuring device according to a seventh embodiment.
Figure 21:
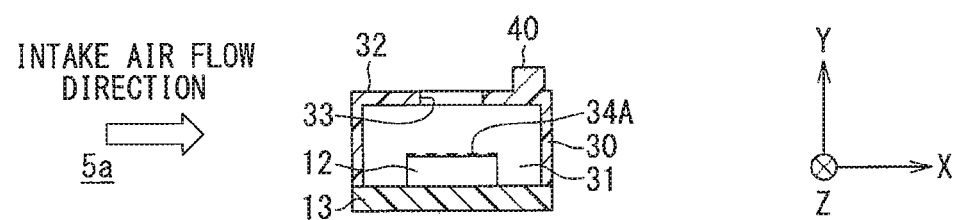
FIG. 21 is a sectional view taken along a line XXI-XXI in FIG. 20.

In the sixth embodiment described above, the inflow port filter 34 is provided to the inflow port 33. In this embodiment, a measurement chamber interior filter 34A is provided to the humidity sensor 12 as shown in FIGS. 20, 21. The pressure loss which is caused by flowing through the inflow port 33 in the seventh embodiment is not so large as that in the configuration in which the filter is provided to the inflow port 33. Therefore, replacement of air in the measurement chamber 31 is not degraded, and high response to humidity is ensured. The filter 34A is housed in the measurement chamber 31. This restricts the filter 34A from falling from the inside of the measurement chamber 31 in the case where the filter 34A falls from the sensor element 12. In the case where the filter is larger than the opening of the inflow port 33, the filter 34A is more restricted from falling from the measurement chamber 31. The measurement chamber interior filter 34A catches foreign matter in intake air and is attached to the humidity sensor 12 so as to cover the moisture sensitive material of the humidity sensor 12.

The filter 34A is made of a material, such as a paper, a resin or the like, which produces the trapping property of dust. A porous filter made of PTFE is preferable as the material of the filter 34A. The porous filter made of PTFE enables not only to catch foreign matter in intake air, but also, due to a water repellent of PTFE, to restrict water drop from entering into the humidity sensor element 12. The filter 34A may be fixed to the humidity sensor 12 by adhesion or welding.

Eighth Embodiment

Figure 22:
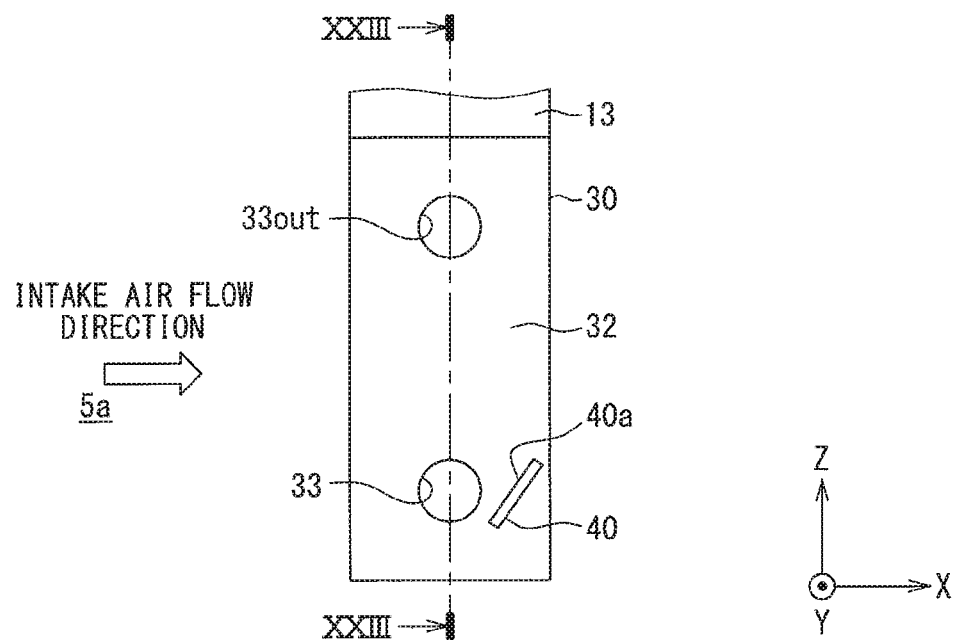
FIG. 22 is a front view showing a part around the humidity sensor of the measuring device according to an eighth embodiment.
Figure 23:
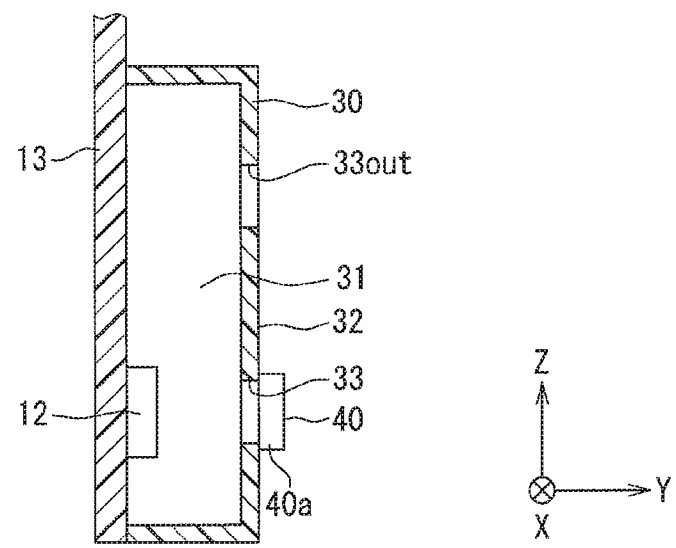
FIG. 23 is a sectional view taken along a line XXIII-XXIII in FIG. 21.

In this embodiment which is shown by FIGS. 22, 23, an outflow port 33 out is added to the case 30 in FIGS. 8-10. The outflow port 33 out is provided in the passage wall surface 32 and forms a through hole communicating the measurement chamber 31 with the intake passage 5a. The outflow 33 out is placed above the inflow port 33 in the Z direction at a center of the case 30 in the direction (X direction), in which intake air flows. The protrusion 40 promotes intake air to flow from the inflow port 33 into the measurement chamber 31 and intake air to flow out from the measurement chamber 31 through the outflow port 33 out. This further promotes the replacement of air between the inside and the outside of the measurement chamber 31.

Ninth Embodiment

Figure 24:
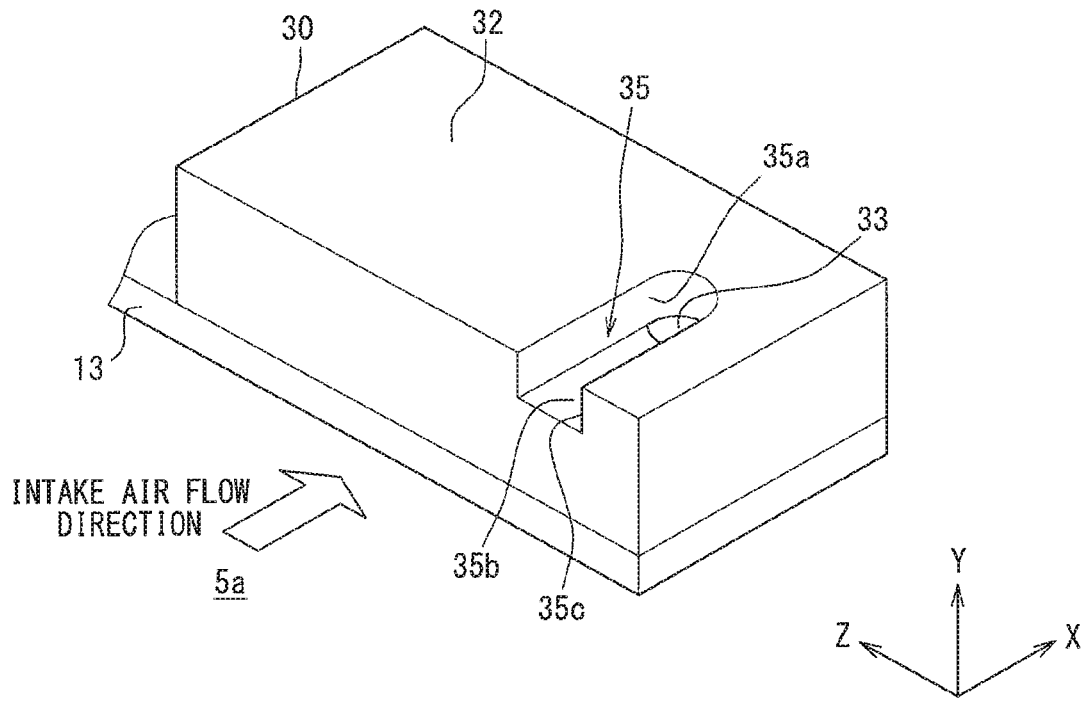
FIG. 24 is a perspective view showing a part around the humidity sensor of the measuring device according to a ninth embodiment.

In this embodiment which is shown in FIG. 24, a concave part 35 is provided to the case 30. The concave part 35 has a shape recessed from the passage wall surface 32 in the Y direction. The concave part 35 includes a side wall 35a, a base wall 35b and an opening 35c which opens toward the upstream in the direction in which intake air flows. The side wall 35a and the base wall 35b surround the concave part 35. Downstream ends of the side wall 35a and the base wall 35b are connected to the inflow port 33. The inflow port 33 is placed at the downstream end of the concave part 35. In other words, the concave part 35 extends toward the upstream from the inflow port 33.

Thereby, a part of intake air flowing in the intake passage 5a flows from the opening 35c into the concave part 35, and flows along the side wall 35a and the base wall 35b. The inflow air flows into the concave part 35 and is guided to flow by the side wall 35a and the base wall 35b. A part of the inflow air flows into the inflow port 33.

In this embodiment, the concave part 35 which is connected to the inflow port 33 is provided. The side wall 35a and the base wall 35b of the concave part 35 guide intake air to flow into the inflow port 33. This promotes the replacement between air in the measurement chamber 31 and air outside of the measurement chamber 31, and enhances the responsiveness of the detection. In this embodiment, the side wall 35a of the concave part 35 guides intake air to flow into the inflow port 33, instead of the protrusion 40.

Tenth Embodiment

Figure 25:
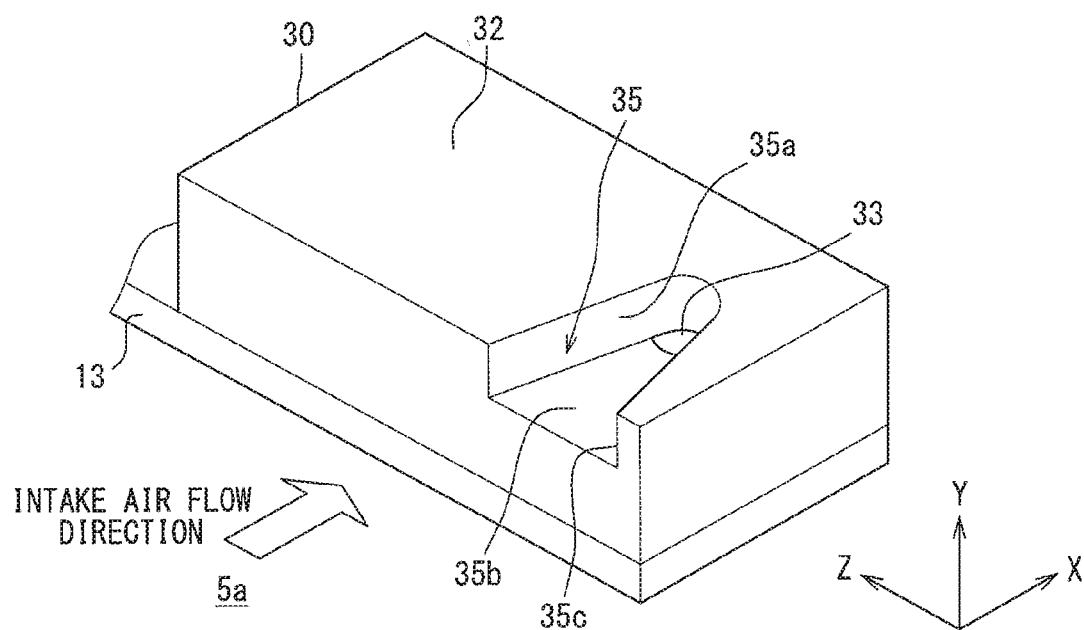
FIG. 25 is a perspective view showing a part around the humidity sensor of the measuring device according to a tenth embodiment.

In the ninth embodiment described above, the side wall 35a of the concave part 35 extends parallel to the direction in which intake air flows. In this embodiment, as shown in FIG. 25, the side wall 35a of the concave part 35 inclines relative to the direction in which intake air flows. More specifically, the two side walls 35a are opposed to each other. The two side walls 35a are inclined such that the distance therebetween gradually reduces in the direction from the upstream side to the downstream side of intake air. In other words, a length of the opening 35c in the Z direction is larger than a length of the inflow port 33 in the Z direction. The two side walls 35a which are opposed to each other connect the opening 35c with the inflow port 33.

Eleventh Embodiment

Figure 26:
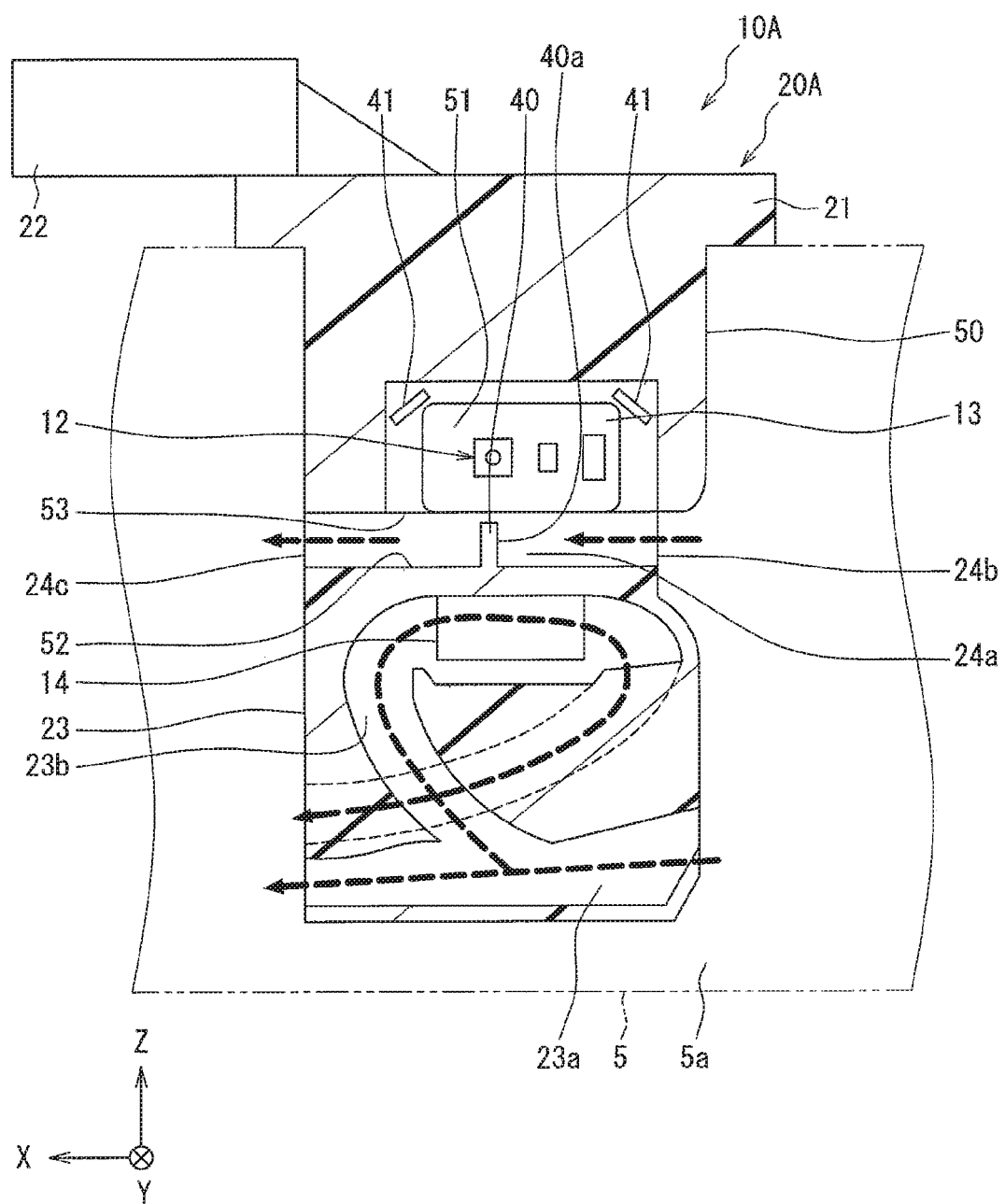
FIG. 26 is a view showing the measuring device which is provided to the air intake pipe according to an eleventh embodiment.

In the first embodiment described above, the protrusion 40 is exposed to the intake passage 5a with the passage wall surface 32. In this embodiment, as shown in FIG. 26, the protrusion 40 is provided to a communication passage 24a which is formed in a humidity detection part 50.

More specifically, the measuring device 10 includes a structure body 20A. The structure body 20A includes the humidity detection part 50 in addition to the flange 21, the connector 22, the flow rate detection part 23. The humidity detection part 50 is molded of a resin integrally with the flow rate detection part 23 and the like. The flow rate detection part 23 includes the first passage 23a and the second passage 23b, similarly to the first embodiment. The flow rate detection sensor 14 is placed at the second passage 23b and detects the flow amount of intake air flowing from the first passage 23a into the second passage 23b.

Figure 27:
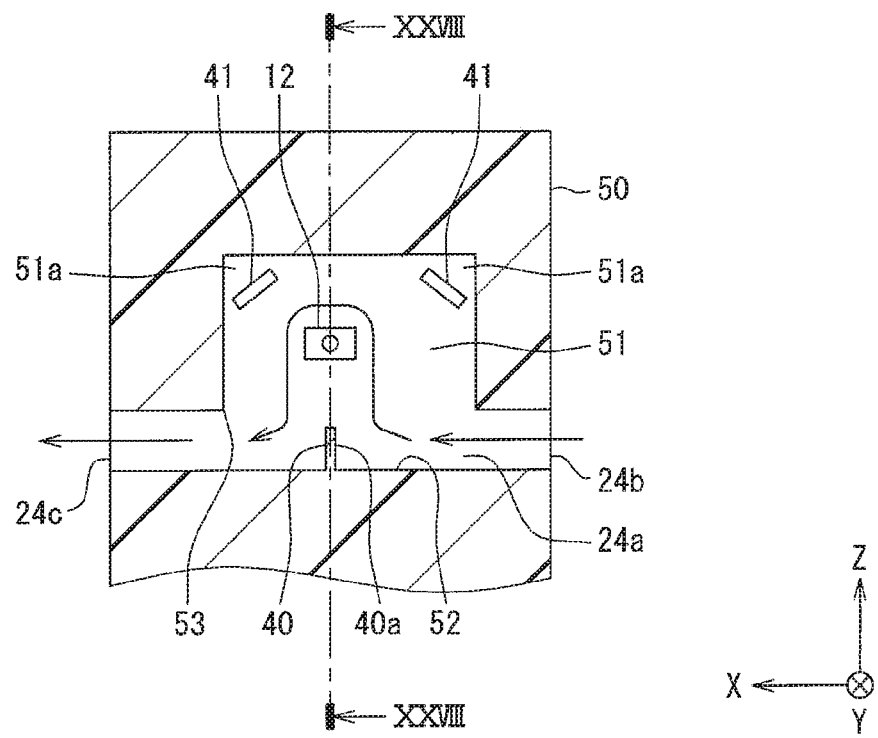
FIG. 27 is a sectional view showing a part around the humidity sensor shown in FIG. 26 schematically.

The humidity detection part 50 includes the communication passage 24a and the measurement chamber 51. The communication passage 24a communicates with the measurement chamber 51 through an inflow port 53. A part of intake air flowing in the intake passage 5a flows into the communication passage 24a through an inlet 24b which is provided at the flow rate detection part 23, and flows out to the intake passage 5a through an outlet 24c which is provided at the flow rate detection part 23. A part of intake air flowing in the communication passage 24a flows into the measurement chamber 51 through the inflow port 53, as shown in FIG. 27. This inflow pushes air in the measurement chamber 51 out to the communication passage 24a.

The communication passage 24a extends straight in the direction (X direction), in which intake air flows. The communication passage 24a is placed above the first passage 23a and parallels to the first passage 23a. A cross section of the communication passage 24a viewed in the X direction may have a rectangle shape or a shape in which the width of the protrusion 40 in the Y direction is larger such that the protrusion 40 closes the communication passage 24a in the Y direction. In a configuration where the protrusion 40 closes the communication passage 24a in the Y direction, more air flows toward the measurement chamber 51 and this enables to replace air in the measurement chamber 51 in a shorter time.

Figure 28:
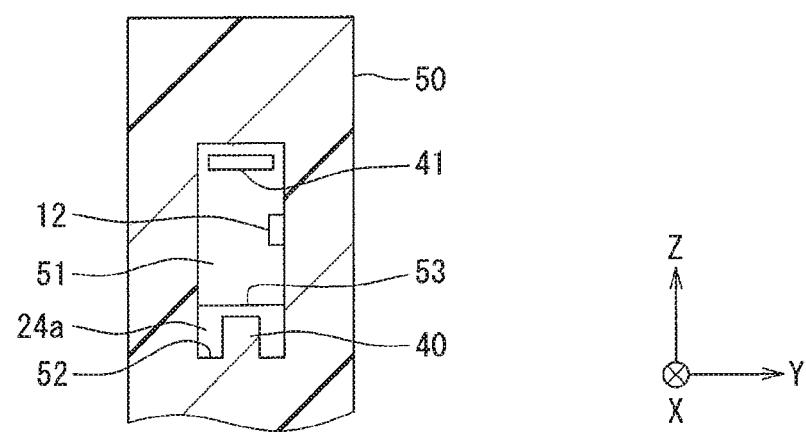
FIG. 28 is a sectional view taken along a line XXVIII-XXVIII in FIG. 27.

The measurement chamber 51 has a rectangular parallelepiped shape. The measurement chamber 51 is placed above the communication passage 24a and parallels to the communication passage 24a. The measurement chamber 51 includes the humidity sensor 12 which is mounted to the board 13. As shown in FIG. 27, the humidity sensor 12 viewed in the Y direction is placed at a center of the measurement chamber 51. On the other hand, as shown in FIG. 28, the humidity sensor 12 viewed in the X direction is placed at the side wall of the measurement chamber 51.

The humidity detection part 50 corresponds to a case which is provided to the communication passage 24a which is flow passage and houses the humidity sensor 12 which is a sensor element. A passage wall surface 52 forms the communication passage 24a in the humidity detection part 50 and is opposed to the inflow port 53. The humidity detection part 50 includes the protrusion 40 protruding from the passage wall surface 52. The protrusion 40 is molded of a resin integrally with the passage wall surface 52 of the humidity detection part 50. The protrusion 40 has a plate form and includes the guide surface 40a at which intake air collides. The protrusion 40 is placed such that the guide surface 40a intersects the direction in which intake air flows. A part of intake air flowing along the passage wall surface 52 is guided to flow into the inflow port 53 by the guide surface 40a. That is, the guide surface 40a promotes inflow of intake air flowing along the passage wall surface 52 to the inflow port 53.

The inflow port 53 is an only place to communicate the measurement chamber 51 with the communication passage 24a. Therefore, an amount of intake air flowing from the inflow port 53 into the measurement chamber 51 is equal to an amount of intake air flowing out from the measurement chamber 51 to the communication passage 24a through the inflow port 53. That is, the protrusion 40 guides intake air flowing along the passage wall surface 52 to flow into the inflow port 53. This promotes replacement of measured gas which is air in the measurement chamber 51 and air outside of the measurement chamber 51.

As shown in FIG. 27, the protrusion 40 is opposed to the inflow port 53 of the passage wall surface 52 and the humidity sensor 12. The guide surface 40a is placed at the center of the inflow port 53 in the direction in which intake air flows. As shown in FIG. 28, an upper end of the protrusion 40 is placed under the inflow port 53, and the entirety of the protrusion 40 is housed in the communication passage 24a. The length of the protrusion 40 in the Y direction is smaller than the length of the communication passage 24a in the Y direction. That is, a clearance exists between the walls of the protrusion 40 in the Y direction and the side walls of the communication passage 24a, respectively.

The measurement chamber 51 has a rectangle shape when viewed in the Y direction and includes shielding plates 41 to restrict intake air which flows from the inflow port 53 from flowing to corner parts 51a of the rectangle. The shielding plates 41 may be molded of a resin integrally with the humidity detection part 50, or may be provided to a cover member which covers the measurement chamber 51. The shielding plate 41 is installed with a simpler structure by providing the shielding plate 41 to the cover member having a simple shape, rather than providing the shielding plate 41 to the humidity detecting part 50, which corresponds to a case, having a complicated shape. A plate surface of the shielding plate 41 is directed to the humidity sensor 12.

More specifically, a perpendicular line passing a center of the plate surface of the shielding plate 41 intersects with the humidity sensor 12. The shielding plate 41 is configured to decrease an area in which air flows with stagnating in the measurement chamber 51 and to enhance the replacement of air in the measurement chamber 51. Therefore, the plate surface of the shielding plate may be a curved plane, not a flat plane.

As described above, in this embodiment, a measuring device 10A includes the humidity detection part 50 (case) housing the humidity sensor 12. The humidity detection part 50 includes the measurement chamber 51 housing the humidity sensor 12, and the inflow port 53 through which a part of intake air flowing in the communication passage 24a (flow passage) flows into the measurement chamber 51. Furthermore, the measuring device 10A includes the protrusion 40 which protrudes from the passage wall surface 52 facing the communication passage 24a and guides inflow air flowing along the passage wall surface 52 to flow into the inflow port 53.

That is, the humidity sensor 12 is housed in the humidity detection part 50. This restrains dust in intake air flowing in the intake passage 5a from attaching to the humidity sensor 12 and enhances the detection accuracy of the humidity sensor 12.

In addition, the protrusion 40 guides air flowing along the passage wall surface 52 to flow into the inflow port 53. This promotes the replacement between air in the measurement chamber 51 and air out of the measurement chamber 51. In a case where the humidity of intake air flowing in the intake passage 5a changes, this enables to enhance the responsiveness of the detection under the change. That is, this enables to restrain the deterioration of the detection accuracy due to the adhesion of the dust and to keep the response of the detection.

Dust flowing in intake air has a larger inertia and hardly changes the flow direction, compared to intake air which is a gas. Therefore, intake air turns toward the inflow port 53 by the protrusion 40 while dust in the intake air hardly turns, and therefore, inertial separation occurs to remove the dust from intake air. The inertial separation allows intake air which is a gas to be curved by the protrusion 40 and easily flow in through the inflow port 53. On the other hand, the dust with a large mass tends to flow straight without turning, and does not easily flow in through the inflow port 53 in comparison with intake air. This configuration enables to restrain the deterioration of the detection accuracy due to the adhesion of the dust and keep the responsiveness of the detection.

Furthermore, the measurement chamber 51 in this embodiment includes the shielding plates 41 to restrict intake air which flows from the inflow port 53 from flowing to the corner parts 51a of the rectangle. This enables to restrain intake air flowing into the measurement chamber 51 from stagnating at the corner parts 51a and to promote the responsiveness of the detection by the humidity sensor 12.

Furthermore, the protrusion 40 in this embodiment is placed at the passage wall surface 52 and opposed to the inflow port 53. This allows intake air which is collided to the protrusion 40 to easily flow into the inflow port 53. Therefore, this configuration enables to promote the replacement between air in the measurement chamber 51 and air out of the measurement chamber 51 and to enhance the responsiveness of the detection.

Furthermore, the protrusion 40 in this embodiment is placed at the passage wall surface 52 and is opposed to the humidity sensor 12. The humidity sensor 12 is placed at a position at which the flow velocity of intake air, which has collided to the protrusion 40 to flow into the measurement chamber 51 through the inflow port 53, is fast. This enhances the responsiveness of the detection.

Twelfth Embodiment

Figure 29:
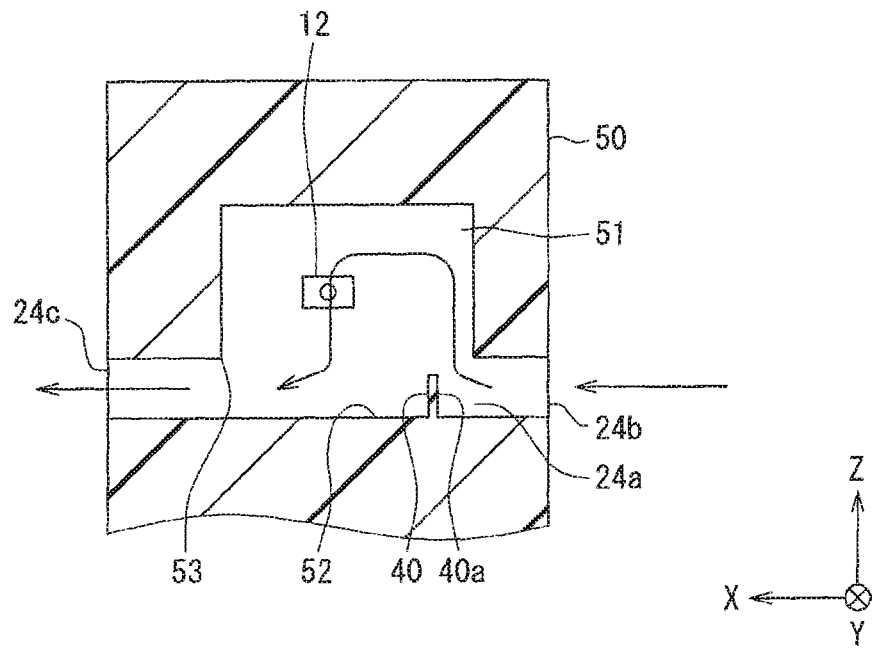
FIG. 29 is a longitudinal sectional view showing a part around the humidity sensor of the measuring device according to a twelfth embodiment.

In the eleventh embodiment described above, the protrusion 40 is provided at the center of the inflow port 53 in the direction in which intake air flows. On the other hand, in this embodiment, the protrusion 40 is provided at the upstream side relative to the center of the inflow port 53 in the direction in which intake air flows, as shown in FIG. 29. The protrusion 40 is placed at a part of the passage wall surface 52 opposed to the inflow port 53. The protrusion 40 is placed at the upstream of a part of the passage wall surface 52 opposed to the humidity sensor 12.

A part of the inflow port 53 which is on the upstream side of the protrusion 40 in the direction in which intake air flows works as an opening through which intake air flows from the communication passage 24a to the measurement chamber 51. On the other hand, a part of the inflow port 53 which is on the downstream side of the protrusion 40 works as an opening through which intake air flows from the measurement chamber 51 to the communication passage 24a. In this embodiment, the protrusion 40 is placed at the upstream side of the center of the inflow port 53. Therefore, the opening area of the inflow port 53 through which intake air flows into the measurement chamber 51 is smaller than the opening area of the inflow port 53 through which intake air flows out from the measurement chamber 51.

Thirteenth Embodiment

Figure 30:
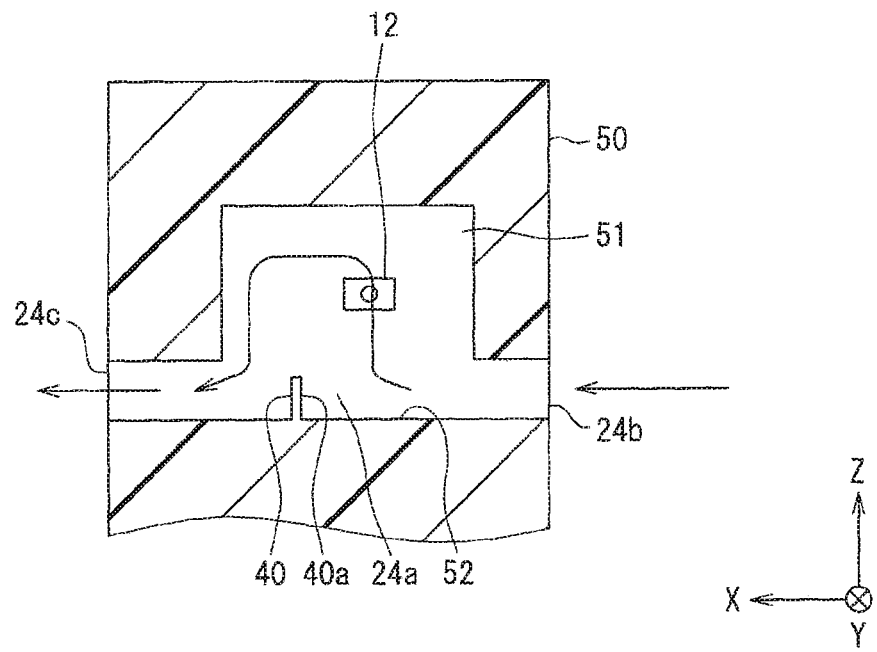
FIG. 30 is a longitudinal sectional view showing a part around the humidity sensor of the measuring device according to a thirteenth embodiment.

In the twelfth embodiment described above, the protrusion 40 is placed at the upstream of the center of the inflow port 53 in the direction in which intake air flows. On the other hand, in this embodiment, the protrusion 40 is placed at the downstream of the center of the inflow port 53 in the direction in which inflow air flows, as shown in FIG. 30. The protrusion 40 is placed at a part of the passage wall surface 52 opposed to the inflow port 53. The protrusion 40 is placed at the downstream of a part of the passage wall surface 52 which is opposite to the humidity sensor 12. In this embodiment, the protrusion 40 is placed at the downstream side of the center of the inflow port 53. Therefore, the opening area of the inflow port 53 through which intake air flows into the measurement chamber 51 is larger than the opening area of the inflow port 53 through which intake air flows out from the measurement chamber 51.

Fourteenth Embodiment

Figure 31:
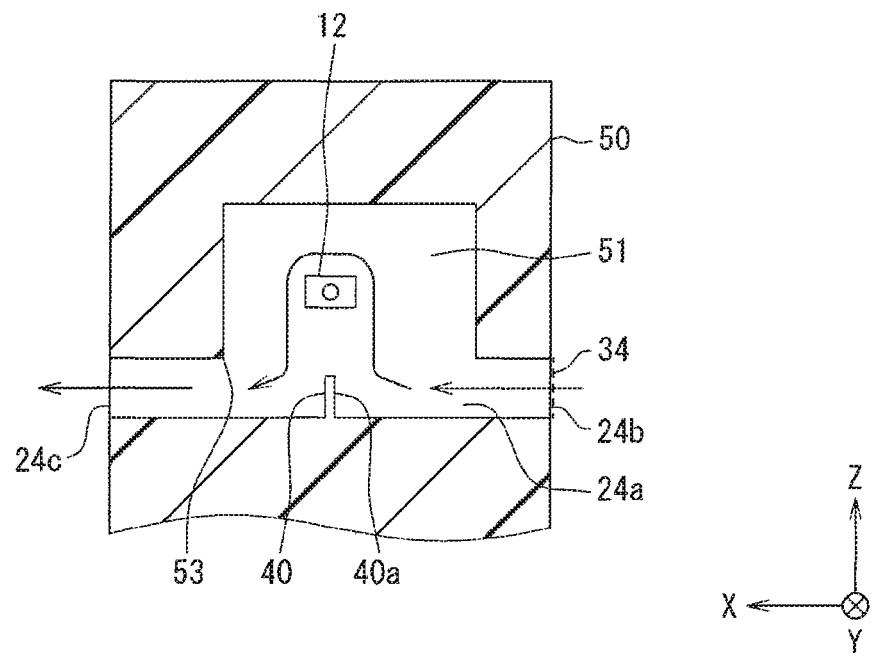
FIG. 31 is a longitudinal sectional view showing a part around the humidity sensor of the measuring device according to a fourteenth embodiment.
Figure 32:
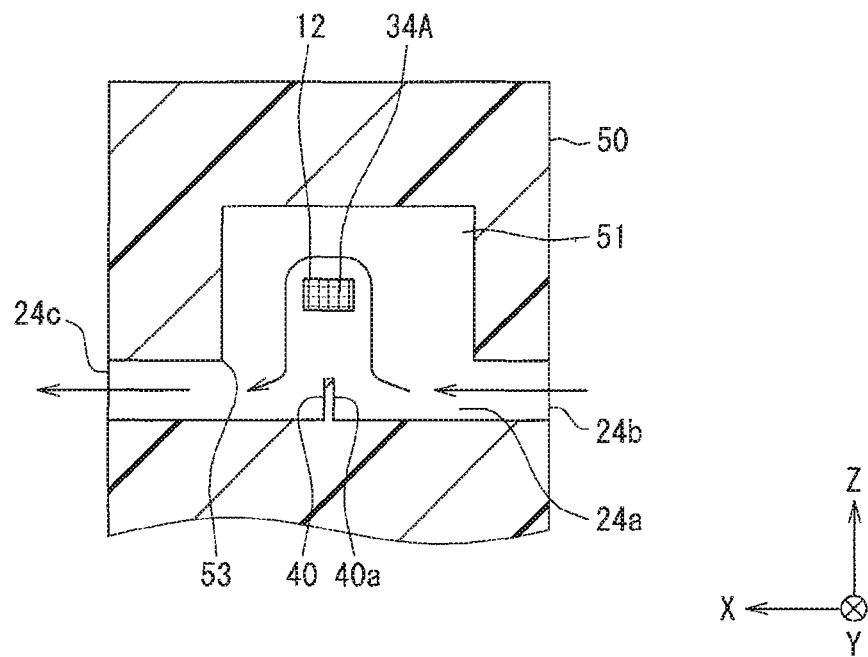
FIG. 32 is a longitudinal sectional view showing a part a part around the humidity sensor of the measuring device according to a fifteenth embodiment.

In this embodiment as shown in FIG. 31, the inflow port filter 34 is added to the humidity detection part 50 shown in FIG. 27. The inflow port filter 34 is in a mesh shape and captures foreign matter in intake air. The inflow port filter 34 is attached to the humidity detection part 50 so as to cover the entirety of the inlet 24b of the communication passage 24a.

In this embodiment, the communication passage 24a includes the inflow port filter 34 to capture foreign matter in intake air. This enables further to restrain the dust in intake air flowing in the communication passage 24a from attaching to the humidity sensor 12.

Fifteenth Embodiment

In the fourteenth embodiment described above, the inflow port filter 34 is provided to the inlet 24b of the communication passage 24a. In this embodiment, the measurement chamber interior filter 34A is provided to the humidity sensor 12. The measurement chamber interior filter 34A is configured to capture foreign matter in intake air and provided to the humidity sensor 12 so as to cover the moisture sensitive material of the humidity sensor 12.

Under the configuration according to the fourteenth embodiment, the inflow port filter 34 causes a pressure loss in the flow into the measurement chamber 51, and this reduces a flow amount of intake air flowing into the measurement chamber 51. On the other hand, under the configuration according to this embodiment, inflow air is not restricted from flowing into the measurement chamber 51, and this keeps the replacement of air in the measurement chamber 51. The measurement chamber interior filter 34A may be fixed to the humidity sensor 12 by adhesion or welding. The humidity sensor 12 may also be covered by a component which is in a cover shape and is adhered with or welded with the filter 34A. Notably, the humidity sensor 12 is provided at the bottom part of the measurement chamber 51 in the Z direction, and the flow velocity of inflow air around the humidity sensor 12 is low. The measurement chamber interior filter 34A is preferably fixed to the humidity sensor 12 by adhesion, welding, or the like, in terms of the promotion of the replacement of air around the humidity sensor 12 by minimizing the area in which the flow velocity is low around the humidity sensor.

Sixteenth Embodiment

Figure 33:
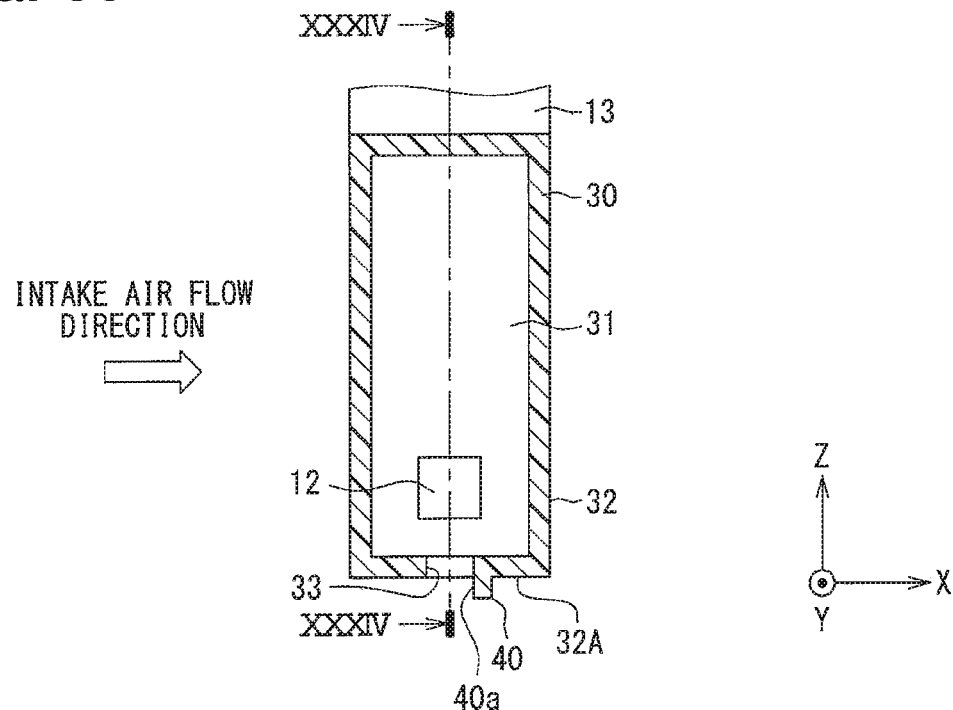
FIG. 33 is a longitudinal sectional view showing a part around the humidity sensor of the measuring device according to a sixteenth embodiment.
Figure 34:
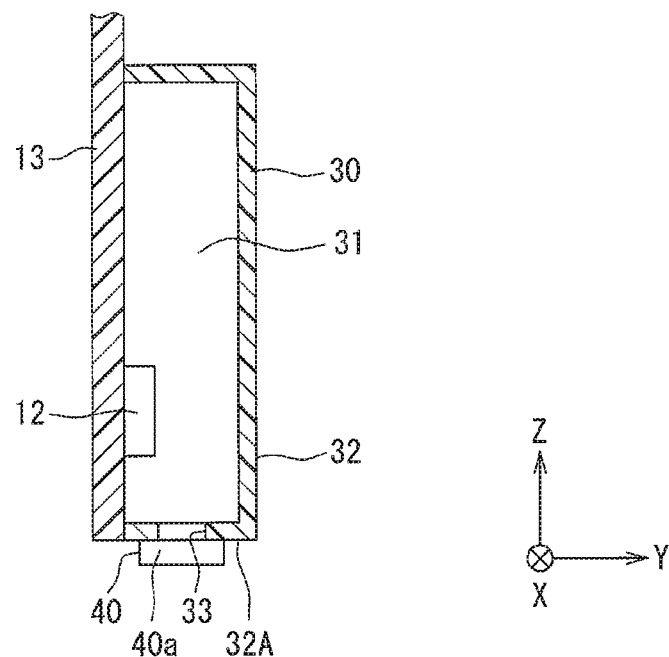
FIG. 34 is a sectional view taken along a line XXXIV-XXXIV in FIG. 33.

In the first embodiment described above, the passage wall surface 32 is a wall of the case 30 along the XZ plane and is opposed to the board 13. The passage wall surface 32 includes the inflow port 33. On the other hand, in this embodiment, as shown in FIGS. 33 and 34, a passage wall surface 32A is a wall of the case 30 along an XY plane. The passage wall surface 32A includes the inflow port 33. The protrusion 40 protrudes from the passage wall surface 32A toward the lower side in the Z direction.

More specifically, the protrusion 40 is adjacent to the downstream side of the inflow port 33 in the passage wall surface 32A. The protrusion 40 is provided such that the guide surface 40a is perpendicular to the direction in which intake air flows. In this embodiment, similarly to the first embodiment in above, the protrusion 40 guides intake air flowing along the passage wall surface 32A to flow into the inflow port 33. This enables to promote the replacement between air in the measurement chamber 31 and air out of the measurement chamber 31 and to enhance the responsiveness of detection.

The present disclosure has been described according to the present embodiments. However, the present disclosure is not limited by above embodiments but can be further modified in various manners as described below. The present disclosure also includes various combinations and structures of the embodiments and other combinations and configurations including only one element of the embodiments, more of the elements of the embodiments, and less of the elements of the embodiments. Variations of the present disclosures in above will be described as below.

In the first embodiment described above, a part of the protrusion 40 is located in the projection area W to which the inflow port 33 is projected from the upstream to the downstream in the direction in which intake air flows. However, the entirety of the protrusion 40 may be located in the projection area W or at the outside of the projection area W.

In the third embodiment described above, the clearance L1 between the downstream end of the inflow port 33 and the protrusion 40 is shorter than the height L2 of the protrusion 40. However, the clearance L1 may be longer than the height L2 of the protrusion 40.

In the eleventh embodiment described above, the protrusion 40 is opposed to the inflow port 53 of the passage wall surface 52. However, the protrusion 40 may be placed at an outside of an area which is opposed to the inflow port 53 of the passage wall surface 52.

According to the eleventh embodiment to the fifteenth embodiment described above, the protrusion 40 is provided such that the guide surface 40a is perpendicular to the direction in which intake air flows. However, the protrusion 40 may be provided such that the guide surface 40a inclines relative to the direction in which intake air flows. In a case where an obtuse angle is formed with respect to the upstream side in the direction in which intake air flows, the pressure loss can be decreased. Furthermore, the protrusion 40 may not protrude from the passage wall surface 52. The protrusion 40 may protrude in the Y direction from the cover member which is made of a resin and covers the measurement chamber 51 and the passage wall surface 52. The protrusion can be installed with a simpler structure by providing the protrusion to the cover member having a simple shape, rather than providing the protrusion to the humidity detecting part 50 (case) having a complicated shape.

In the above embodiments, both the intake passage 5a (flow passage) which is communicated to the inflow port 33 and the communication passage 24a (flow passage) which is communicated to the inflow port 53 extend straight. On the other hand, the flow passage which is communicated to the inflow port 33 and the inflow port 53 may extend with a curved shape.

In above embodiments, the humidity sensor 12 which detects humidity in air is applied to the sensor element of the physical quantity measuring device 10 which detects a physical quantity of gas flowing in the flow passage. However, a sensor element which detects another specific physical quantity related to a gas such as a temperature, a pressure, a thermal conductivity, a concentration, a flow amount, or the like, rather than humidity, may be applied.

In the eleventh embodiment described above, the shielding plate 41 is provided as shown in FIG. 26. The shielding plate 41 may be applied to the embodiments rather than the eleventh embodiment. For example, the shielding plate 41 may be placed in the case 30 of the measuring device 10 which is shown in FIG. 1.

The present disclosure has been described according to the present embodiments. However, the present disclosure is not limited by the embodiments or structure. The present disclosure encompasses various variations and modifications within equivalents. This present disclosure also encompasses various combinations and embodiments, and furthermore, encompasses one or more or less of elements and combinations thereof.

The invention claimed is:

1. A physical quantity measuring device configured to detect a physical quantity of gas flowing in an intake passage, comprising:
   a first flow passage;
   a first sensor element configured to detect a first physical quantity of gas flowing in the first flow passage and to output a detection signal according to the physical quantity;
   a case that defines the first flow passage and defines
   a measurement chamber that houses the first sensor element and
   a first inflow port that is configured to cause a part of gas flowing in the intake passage to flow into the measurement chamber therethrough;
   a protrusion that protrudes from a passage wall surface facing the first flow passage and configured to guide gas flowing along the passage wall surface toward the first inflow port;
   a second flow passage that is different from the first flow passage; and
   a second sensor element configured to detect a second physical quantity of gas flowing in the second flow passage and to output a detection signal according to the second physical quantity, wherein
   the second flow passage includes a first passage and a second passage,
   the first passage extends along a direction of gas flowing in the intake passage and is configured to intake and distribute a part of gas flowing in the intake passage, and
   the second passage is branched from the first passage and is configured to intake a part of gas flowing in the first passage to guide the gas to the second sensor element and to circulate the gas through the second passage to cause the gas to flow out to the intake passage.

2. The physical quantity measuring device according to claim 1, wherein
   the intake passage to guide gas to a combustion chamber of an internal engine, and
   an outer surface of the case defines the passage wall surface when the case is provided to the intake passage.

3. The physical quantity measuring device according to claim 2, wherein
   the protrusion is located in a projection area to which the first inflow port is projected from an upstream to a downstream in a direction in which intake air flows in the first flow passage.

4. The physical quantity measuring device according to claim 3, wherein
   a clearance between a downstream end of the first inflow port and the protrusion is shorter than a height of the protrusion.

5. The physical quantity measuring device according to claim 2, wherein
   the protrusion is arranged to straddle the inflow port.

6. The physical quantity measuring device according to claim 1, further comprising:
   a structure body configured to be provided to the intake passage to guide gas to a combustion chamber of an internal combustion engine, the structure body including a communication passage, which is configured to communicate to the intake passage, and the case; wherein
   the communication passage is the first flow passage, and
   a wall surface of the structure body facing the communication passage defines the passage wall surface.

7. The physical quantity measuring device according to claim 6, wherein
   the protrusion is located at a part of the wall surface opposed to the first inflow port.

8. The physical quantity measuring device according to claim 7, wherein
   the protrusion is located at a part of the wall surface opposed to the first sensor element.

9. The physical quantity measuring device according to claim 1, wherein
   the protrusion extends and inclines with respect to a direction in which gas flows in the communication passage.

10. The physical quantity measuring device according to claim 9, wherein
    the protrusion includes two protrusions opposed to each other through the first inflow port, and
    the two protrusions are inclined such that a distance therebetween gradually reduces in the direction from the upstream side to the downstream side of gas.

11. The physical quantity measuring device according to claim 10, wherein
    an entirety of the protrusion is placed on an upstream side relative to an upstream end of the first inflow port in the direction in which gas flows in the communication passage.

12. The physical quantity measuring device according to claim 1, wherein
    the measurement chamber has a rectangular parallelepiped shape, and
    the measurement chamber includes a shielding plate configured to restrict gas flowing from the first inflow port from flowing to a corner part of the rectangle.

13. The physical quantity measuring device according to claim 1, wherein
    the first inflow port includes an inflow port filter configured to capture foreign matter in gas.

14. The physical quantity measuring device according to claim 1, wherein
    the first sensor element includes a measurement chamber interior filter configured to capture foreign matter in gas in the measurement chamber.

15. The physical quantity measuring device according to claim 1, wherein
 the first flow passage and the second passage are in the case that is a singular body, and
 the case includes a passage wall that partitions the first flow passage from the second passage.

\* \* \* \* \*